(12) United States Patent
Park et al.

(10) Patent No.: US 11,675,392 B2
(45) Date of Patent: Jun. 13, 2023

(54) ELECTRONIC DEVICE INCLUDING ROLLABLE DISPLAY

(71) Applicant: Samsung Electronics Co., Ltd., Suwon-si (KR)

(72) Inventors: Jinyong Park, Suwon-si (KR); Dongku Kang, Suwon-si (KR); Jichul Kim, Suwon-si (KR); Bongkyu Min, Suwon-si (KR); Baekeun Cho, Suwon-si (KR); Chihyun Cho, Suwon-si (KR); Hyuncheol Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/564,773

(22) Filed: Dec. 29, 2021

(65) Prior Publication Data
US 2022/0171434 A1   Jun. 2, 2022

Related U.S. Application Data

(63) Continuation of application No. PCT/KR2021/018025, filed on Dec. 1, 2021.

(30) Foreign Application Priority Data

Dec. 1, 2020   (KR) .................. 10-2020-0165975

(51) Int. Cl.
*G06F 1/16*   (2006.01)
*G06F 1/18*   (2006.01)

(52) U.S. Cl.
CPC .......... *G06F 1/1652* (2013.01); *G06F 1/1624* (2013.01); *G06F 1/1635* (2013.01); *G06F 1/1698* (2013.01); *G06F 1/183* (2013.01)

(58) Field of Classification Search
CPC .... G06F 1/1652; G06F 1/1683; H05K 7/1491
See application file for complete search history.

(56) References Cited

U.S. PATENT DOCUMENTS 6,223,393 B1 *   5/2001   Knopf .................. G06F 1/1618
                                                              16/386
8,493,726 B2 *   7/2013   Visser .................... G09F 9/301
                                                              361/679.05
(Continued)

FOREIGN PATENT DOCUMENTS

KR   10-2010-0116321 A   11/2010
KR   10-2012-0120661 A   11/2012
(Continued)

OTHER PUBLICATIONS

International Search Report dated Mar. 8, 2022, issued in International Patent Application No. PCT/KR2021/018025.

*Primary Examiner* — Adrian S Wilson
(74) *Attorney, Agent, or Firm* — Jefferson IP Law, LLP

(57) ABSTRACT

An electronic device is provided. The electronic device includes a rollable display. The electronic device may include a main bracket configured to support the first portion of the rollable display, a roller member disposed in the first direction from the main bracket and arranged in a third direction perpendicular to the first direction, at least one folding support member disposed between the main bracket and the roller member and configured to support the second portion of the rollable display, a circuit board disposed to overlap at least a portion of the main bracket, at least one electronic component disposed adjacent to the roller member, and a FPCB configured to electrically connecting the main circuit board and the electronic component, wherein the FPCB is disposed to pass through the folding support
(Continued)

member and extends from a portion of the circuit board to a portion of the electronic component.

23 Claims, 21 Drawing Sheets

(56) References Cited

U.S. PATENT DOCUMENTS

| | | | | |
|---|---|---|---|---|
| 9,535,465 | B2* | 1/2017 | Bohn | G06F 1/1681 |
| 9,606,583 | B2* | 3/2017 | Ahn | G06F 1/1681 |
| 10,095,273 | B2* | 10/2018 | Choi | G09F 9/301 |
| 10,194,543 | B2* | 1/2019 | Seo | G06F 1/1626 |
| 10,742,784 | B1 | 8/2020 | Jo et al. | |
| 10,820,433 | B2 | 10/2020 | Cha | |
| 10,999,944 | B2* | 5/2021 | Park | G06F 1/16 |
| 11,294,429 | B2 | 4/2022 | Oh et al. | |
| 2010/0273539 | A1 | 10/2010 | Lee et al. | |
| 2011/0043976 | A1* | 2/2011 | Visser | G09F 9/301 |
| | | | | 361/679.01 |
| 2012/0268879 | A1 | 10/2012 | Kim et al. | |
| 2019/0141843 | A1 | 5/2019 | Park et al. | |
| 2019/0169896 | A1* | 6/2019 | Regimbal | G06F 1/1683 |
| 2019/0327834 | A1 | 10/2019 | Kim et al. | |
| 2019/0387633 | A1 | 12/2019 | Liao | |
| 2020/0013317 | A1 | 1/2020 | Cho | |
| 2020/0245477 | A1* | 7/2020 | Park | H05K 5/0017 |
| 2020/0253069 | A1* | 8/2020 | Cha | G06F 1/1681 |
| 2020/0371558 | A1* | 11/2020 | Kim | H04M 1/0268 |
| 2021/0135492 | A1 | 5/2021 | Kim et al. | |
| 2021/0240294 | A1 | 8/2021 | Ko et al. | |
| 2021/0263558 | A1 | 8/2021 | Bie et al. | |

FOREIGN PATENT DOCUMENTS

| | | |
|---|---|---|
| KR | 10-2019-0049454 A | 5/2019 |
| KR | 10-2019-0086305 A | 7/2019 |
| KR | 10-2019-0123122 A | 10/2019 |
| KR | 10-2019-0124009 A | 11/2019 |
| KR | 10-2020-0095301 A | 8/2020 |
| KR | 10-2020-0124989 A | 11/2020 |
| WO | 2019/194520 A1 | 10/2019 |
| WO | 2020/014865 A1 | 1/2020 |

* cited by examiner

ELECTRONIC DEVICE INCLUDING ROLLABLE DISPLAY

CROSS-REFERENCE TO RELATED APPLICATION(S)

This application is a continuation application, claiming priority under § 365(c), of an International application No. PCT/KR2021/018025, filed on Dec. 1, 2021, which is based on and claims the benefit of a Korean patent application number 10-2020-0165975, filed on Dec. 1, 2020, in the Korean Intellectual Property Office, the disclosure of which is incorporated by reference herein in its entirety.

TECHNICAL FIELD

The disclosure relates to an electronic device including a rollable display.

BACKGROUND ART

With the development of display technology, research and development of electronic devices having a rollable display (or a flexible display) are being actively conducted.

Electronic devices are gradually changing from a uniform rectangular shape to various shapes. For example, an electronic device is being researched and developed to have a form factor in which a display is capable of being folded, bent, rolled, or unfolded by applying a rollable display to the electronic device.

The above information is presented as background information only to assist with an understanding of the disclosure. No determination has been made, and no assertion is made, as to whether any of the above might be applicable as prior art with regard to the disclosure.

DISCLOSURE OF THE INVENTION

Technical Problem

Recently, by applying a rollable display to an electronic device, a slidable electronic device in which the display region of the display is variable is being actively researched and developed. In the slidable electronic device, a portion of the rollable display may be slid into or out of the inside of the housing in association with the movement of at least a portion of the housing of the electronic device in a sliding manner.

Aspects of the disclosure are to address at least the above-mentioned problems and/or disadvantages and to provide at least the advantages described below. Accordingly, an aspect of the disclosure is to provide an electronic device in which, when a portion of a rollable display is slid out, the rollable display can be stably supported, and by designing an arrangement of a flexible printed circuit board using a mechanical part supporting the rollable display, the circuit board and electronic component (or another circuit board) disposed adjacent to the rollable display can be electrically connected to each other.

Another aspect of the disclosure is to provide an electronic device, in which a flexible printed circuit board (FPCB) (or a coaxial cable) is flexibly changeable according to a change in the state of the electronic device by using a mechanical part (or a support member) supporting the rollable display, and which includes a support member capable of being used as a heat dissipation structure and/or an antenna structure.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing, a rollable display supported by the housing and including a display region an area of which is adjusted in association with movement of at least a portion of the housing in a first direction, wherein the display region includes a first portion that is fixedly exposed an outside irrespective of the movement of the at least a portion of the housing in the first direction, and a second portion that extends from one end of the first portion and is exposed to the outside by being pulled out from an internal space of the housing in association with the movement of the at least a portion of the housing in the first direction, a main bracket disposed in the internal space of the housing and configured to support the first portion of the rollable display, a roller member disposed in the first direction from the main bracket and arranged in a third direction perpendicular to the first direction, at least one folding support member disposed between the main bracket and the roller member and configured to support the second portion of the rollable display, wherein the folding support member includes a first support member coupled to be rotatable from one side surface of the main bracket, disposed to form an angle in a predetermined first range with the one side surface of the main bracket when the electronic device is in a first state in which the second portion of the rollable display is visually exposed in the outside, and disposed to face the one side surface of the main bracket when the electronic device is in a second state in which the second portion of the rollable display is not visually exposed in the outside, and a second support member coupled to be rotatable from one end of the first support member, disposed to form an angle in a predetermined range with the first support member when the electronic device is in the first state, and disposed parallel with the first support member when the electronic device is in the second state, a circuit board disposed to overlap at least a portion of the main bracket, at least one electronic component disposed adjacent to the roller member, and a flexible printed circuit board (FPCB) configured to electrically connect the circuit board and the electronic component, wherein the FPCB is disposed to pass through the first support member and the second support member of the folding support member and extends from a portion of the circuit board to a portion of the electronic component.

Advantageous Effects of Invention

According to various embodiments, in an electronic device, when a portion of a rollable display is slid out, the rollable display can be stably supported, and by designing an arrangement of a flexible printed circuit board using a mechanical part supporting the rollable display, the circuit board and electronic component (or another circuit board) disposed adjacent to the rollable display can be electrically connected to each other. In addition, various effects that may be directly or indirectly appreciated through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
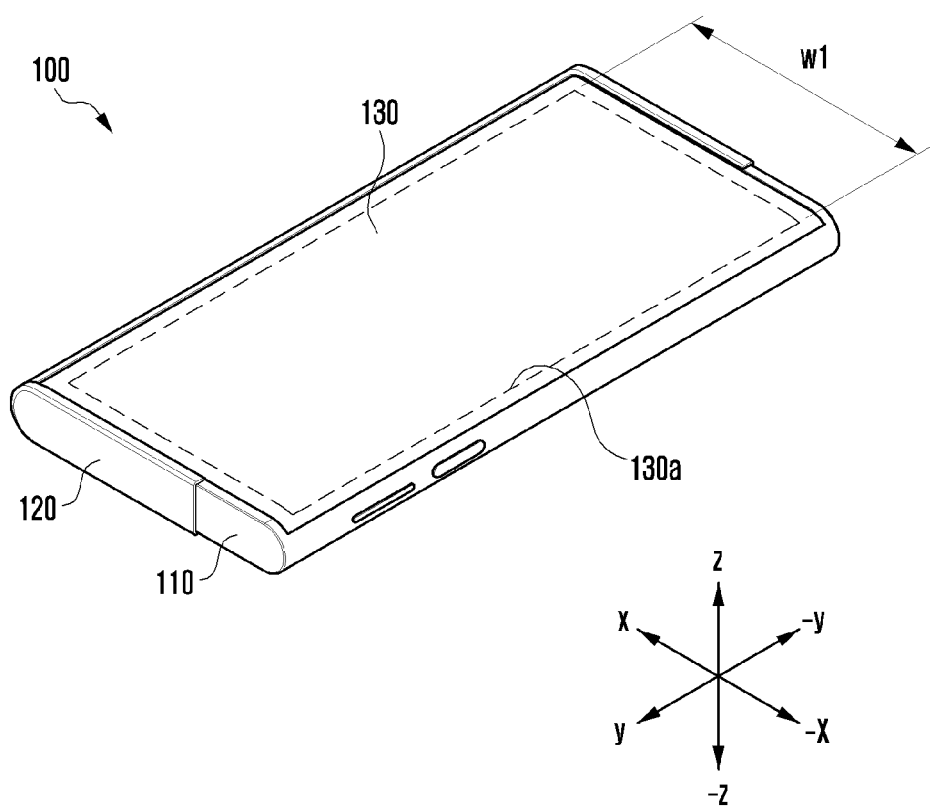
FIG. 1 is a perspective view of an electronic device illustrating a first state according to an embodiment of the disclosure.

FIG. 1 is a perspective view of an electronic device illustrating a first state (e.g., a contracted state (e.g., a slide-in state)) according to an embodiment of the disclosure.

Figure 2:
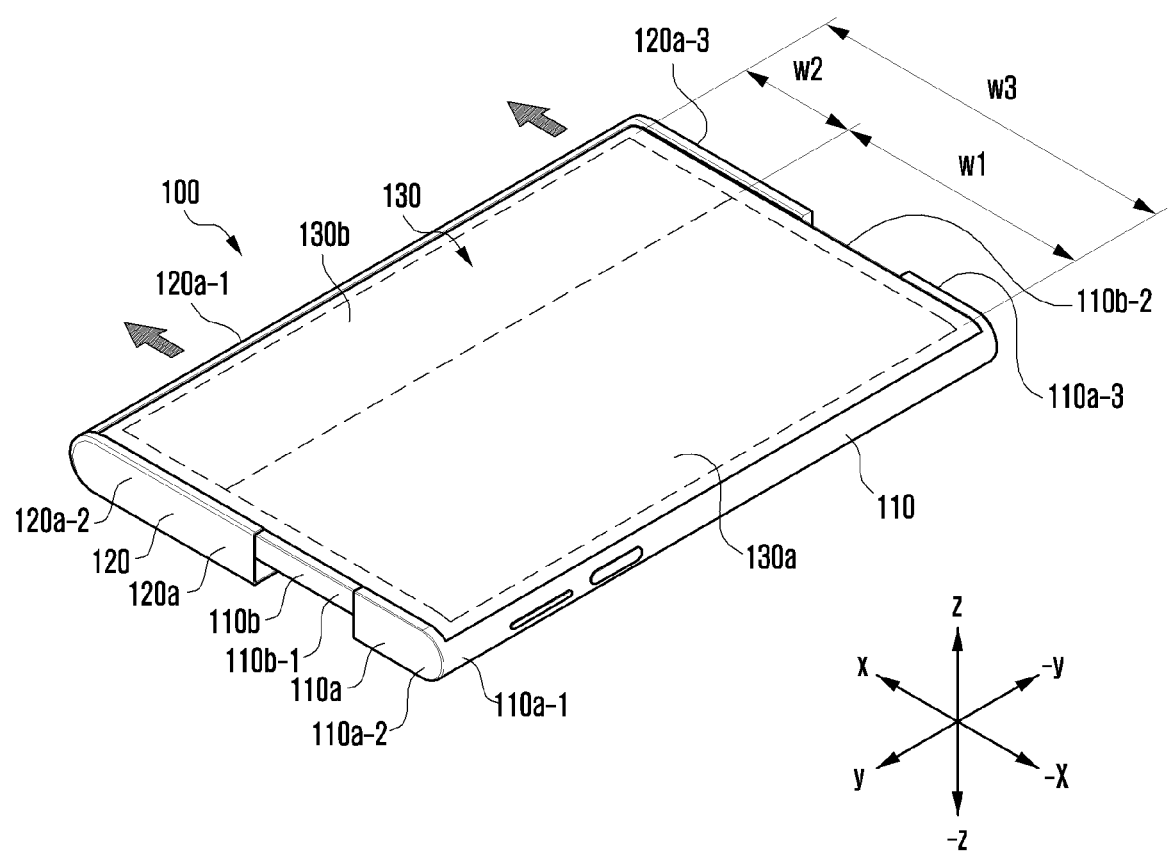
FIG. 2 is a perspective view of an electronic device illustrating a second state according to an embodiment of the disclosure.

FIG. 2 is a perspective view of an electronic device illustrating a second state (e.g., an expanded state (e.g., a slide-out state)) according to an embodiment of the disclosure.

Referring to FIGS. 1 and 2, a foldable electronic device 100 according to various embodiments may include a first housing 110 and a second housing 120. According to an embodiment, the second housing 120 may move from the first housing 110 in a predetermined direction, for example, in a first direction (the x direction). For example, the second housing 120 may slide from the first housing 110 by a predetermined distance (e.g., a second width w2) in the first direction (the x direction). According to an embodiment, the second housing 120 may reciprocate within a range within a predetermined distance (e.g., a second width w2) in the first direction (the x direction) from a portion of the first housing 110.

In various embodiments of the disclosure, the state in which the second housing 120 is slid from the first housing 110 in the first direction (the x direction) may be defined as a second state (e.g., an expanded state or a slide-out state) of the electronic device 100. In various embodiments of the disclosure, the second state of the electronic device 100 may be defined as a state in which the second portion 130b of the rollable display 130 is visually exposed in the outside.

In various embodiments of the disclosure, the state in which the second housing 120 is slid toward the first housing 110, for example, in the second direction (the −x direction) opposite to the first direction (x direction) may be defined as a first state (e.g., a contracted state or a slide-in state) of the electronic device 100. In various embodiments of the disclosure, the first state of the electronic device 100 may be defined as a state in which the second portion 130b of the rollable display 130 is not visually exposed in the outside.

In various embodiments, the first state may be referred to as a first shape, and the second state may be referred to as a second shape. For example, the first shape may include a normal state, a contracted state, or a closed state, and the second shape may include an opened state. In addition, according to an embodiment, the electronic device 100 may have a third state (e.g., an intermediate state) between the first state and the second state. For example, the third state may be referred to as a third shape, and the third shape may include a free stop state.

When the electronic device 100 according to various embodiments of the disclosure is switched to the second state and/or to the first state, the electronic device 100 may be manually switched by a user's manipulation or may be automatically switched via a drive mechanism (not illustrated) (e.g., a drive motor, a reduction gear module, and/or a gear assembly) disposed inside the second housing 120. According to an embodiment, the operation of the drive mechanism may be triggered based on a user input. According to an embodiment, the user input for triggering the operation of the drive mechanism may include a touch input, a force touch input, and/or a gesture input via the rollable display 130. In another embodiment, the user input for triggering the operation of the drive mechanism may include a sound input (a voice input), or an input using a physical button exposed to the outside of the first housing 110 or the second housing 120.

According to an embodiment, since the second housing 120 is designed to slide, the electronic device 100 may be referred to as a "slidable electronic device 100" or since at least a portion of the rollable display 130 is designed to be wound inside the second housing 120 (or the first housing 110) based on the sliding movement of the second housing 120, the electronic device 100 may be referred to as a "rollable electronic device 100".

According to an embodiment, in the electronic device 100, the second housing 120 may be coupled to be at least partially slide from the first housing 110. According to an embodiment, the coupling shape between the first housing 110 and the second housing 120 of the electronic device 100 is not limited to the shape and assembly illustrated in FIGS. 1 and 2, but may be implemented by a combination and/or an assembly of different shapes or components.

According to an embodiment, the first housing 110 of the electronic device 100 may include side members 110a and 110b surrounding some side surfaces of the electronic device 100. According to an embodiment, the side members 110a and 110b of the first housing 110 may include a first side member 110a, which is always visually exposed in the outside without being inserted into the second housing 120 in the second state and the first state of the electronic device 100, and a second side member 110b, which is inserted into or pulled out from the internal space of the second housing 120 through one end of the second housing 120.

According to an embodiment, the first side member 110a may include a first side surface 110a-1 oriented in the second direction of the electronic device 100 (the −x direction), a second side surface 110a-2, which is bent from one end of the first side surface 110a-1 and is oriented in a third direction (the y direction), and a third side surface 110a-3, which is bent from the other end of the first side surface 110a-1 and is oriented in the fourth direction (the −y direction).

According to an embodiment, the second side member 110b may include a fourth side surface 110b-1 disposed to be oriented in the third direction (the y direction) and disposed to have a step from the second side surface 110a-2, and a fifth side surface 110b-2 disposed to be oriented in the fourth direction (the −y direction) and disposed to have a step from the third side surface 110a-3.

According to an embodiment, the second side member 110b of the first housing 110 may not be visually exposed in the outside in the first state, and may be visually exposed in the outside in the second state.

According to an embodiment, the second housing 120 of the electronic device 100 may include a third side member 120a surrounding some other side surfaces of the electronic device 100. According to an embodiment, the third side member 120a of the second housing 120 may include a six side surface 120a-1 oriented in the first direction of the electronic device 100 (the x direction), a seventh side surface 120a-2, which is bent from one end of the sixth side surface 120a-1 and oriented in the third direction (the y direction), and an eighth side surface 120a-3, which is bent from the other end of the sixth side surface 120a-1 and is oriented in the fourth direction (the −y direction).

According to an embodiment, the seventh side surface 120a-2 of the third side member 120a may be coupled to the fourth side surface 110b-1 of the first side member 110a in a sliding manner. For example, when the electronic device 100 is in the first state, the seventh side surface 120a-2 may be disposed to face the fourth side surface 110b-1 in the internal space of the second housing 120.

According to an embodiment, when the electronic device 100 is in the first state, one end of the seventh side surface 120a-2 may be disposed to be in contact with one end of the second side surface 110a-2. According to an embodiment, as illustrated in FIG. 1, when the electronic device 100 is in the first state, the surface of the seventh side surface 120a-2 and the surface of the second side surface 110a-2 may be disposed and processed to provide a continuous surface without forming a step when visually observed.

According to an embodiment, the eighth side surface 120a-3 of the third side member 120a may be coupled to the fifth side surface 110b-2 of the first side member 110a in a sliding manner. For example, when the electronic device 100 is in the first state, the eighth side surface 120a-3 may be disposed to face the fifth side surface 110b-2 in the internal space of the second housing 120.

According to an embodiment, when the electronic device 100 is in the first state, one end of the eighth side surface 120a-3 and one end of the third side surface 110a-3 may be disposed to be in contact with each other. According to an embodiment, as illustrated in FIG. 1, when the electronic device 100 is in the first state, the surface of the eighth side surface 120a-3 and the surface of the second side surface 110a-2 may be disposed and processed to provide a continuous surface without forming a step when visually observed.

According to an embodiment, the rollable display 130 may be disposed to be visually exposed in the outside in the front direction (the z direction) of each of the first housing 110 and the second housing 120. According to an embodiment, the display region of the rollable display 130 may be defined to include a first portion 130a and a second portion 130b.

According to an embodiment, the first portion 130a of the rollable display 130 may be a display region that is fixedly and visually exposed in the outside regardless of whether the electronic device 100 is in the second state or in the first state. For example, the first portion 130a of the rollable display 130 may be fixed without moving regardless of the sliding movement of the second housing 120. According to an embodiment, the first portion 130a of the rollable display 130 may have a first width w1.

According to an embodiment, the second portion 130b of the rollable display 130 may be a display region extending from one end of the first portion 130a, and may be pulled into the internal space of the second housing 120 or pulled out to the outside from the internal space of the second housing 120 in association with the sliding movement of the second housing 120. According to an embodiment, a hole (not illustrated) through which the second portion 130b of the rollable display 130 is pulled out or pulled into may be disposed adjacent to the sixth side surface 120a-1 of the second housing 120. For example, the second portion 130b of the rollable display 130 may be pulled out or pulled into from the boundary of the sixth side surface 120a-1 of the second housing 120.

According to an embodiment, in the second state, the second portion 130b of the rollable display 130 may be pulled out from the internal space of the second housing 120 to be visually exposed in the outside. According to an embodiment, in the first state, the second portion 130b of the rollable display 130 may not be visually exposed from the outside by being pulled into the internal space of the second housing 120. According to an embodiment, the second portion 130b of the rollable display 130 may have a second width w2.

According to an embodiment, in the first state, the display area of the rollable display 130 may have a first width w1 since only the first portion 130a of the rollable display 130 is visually exposed in the outside.

According to an embodiment, in the second state, the display area of the rollable display 130 may have a third width w3 larger than the first width w1 since the first portion 130a and the second portion 130b of the rollable display 130 are visually exposed in the outside. For example, in the second state, the display area of the rollable display 130 may have the third width w3 by being expanded by the second width w2, which is the maximum width of the second portion 130b.

According to an embodiment, the electronic device 100 may be driven in an intermediate state in which the second portion 130b of the rollable display 130 is not maximally pulled out. For example, the intermediate state of the electronic device 100 may be defined as the state in which the display area of the rollable display 130 is larger than the first width w1 and smaller than the third width w3. When the electronic device 100 according to various embodiments of the disclosure is switched to the intermediate state, the electronic device 100 may be manually switched by a user's manipulation or may be automatically switched via a drive mechanism (not illustrated) (e.g., a drive motor, a reduction gear module, and/or a gear assembly) disposed inside the second housing 120. According to an embodiment, a user input for triggering the operation of the drive mechanism for switching to the intermediate state may include a touch input, a force touch input, and/or a gesture input via the rollable display 130. In another embodiment, the user input for triggering the operation of the drive mechanism may include a sound input (a voice input), or an input using a physical button exposed to the outside of the first housing 110 or the second housing 120.

In various embodiments of the disclosure, the first portion 130a of the rollable display 130 may be defined as a "fixed display region" because the first portion 130a is fixedly exposed to the outside regardless of the movement of the second housing 120. In various embodiments of the disclosure, the second portion 130b of the rollable display 130 may be defined as a "variable display region" because the second portion 130b is exposed to the outside based on the movement of the second housing 120 or is not exposed to the outside by being inserted into the inside of the second housing 120 (or the inside of the first housing 110).

According to various embodiments, although not illustrated, the electronic device 100 may include a sensor module and/or a camera module.

According to an embodiment, the sensor module may be disposed under the rollable display 130 (e.g., in the −z direction from the rollable display 130), and may detect an external environment based on information (e.g., light) received through the rollable display 130. According to an embodiment, the sensor module may include at least one of a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an indicator. According to an embodiment, at least some sensor modules of the electronic device 100 may be visually exposed to the outside through a partial region of the rollable display 130.

According to an embodiment, the camera module may include one lens or two or more lenses (e.g., a wide-angle lens, an ultra-wide-angle lens, or a telephoto lens) and image sensors. In some embodiments, the camera module may include a light detection and ranging (LiDAR) sensor, and a time-of-flight (TOF) lens and/or image sensor. According to various embodiments, the camera module may be disposed in an internal space of the electronic device 100 to be in contact with the external environment through an opening or a transmission area perforated in the rollable display 130. According to an embodiment, the area of the rollable display 130 facing the camera module may be formed as a transmission region having a predetermined transmittance as a portion of a content display region. According to an embodiment, the transmission region may have a transmittance in the range of about 5% to about 20%. The transmission region may include a region overlapping an effective region (e.g., field of view (FOV)) of the camera module through which light captured by an image sensor to generate an image passes. For example, the transmission region of the rollable display 130 may include a region having a lower pixel density and/or a lower wiring density than the surrounding region. For example, the camera module may include an under display camera (UDC).

An electronic device (e.g., the electronic device 100 in FIG. 1) according to various embodiments may include housings (e.g., the first housing 110 and the second housing 120 in FIG. 1), a rollable display (e.g., the rollable display 130 in FIG. 1) supported by the housings 110 and 120 and including a display region, an area of which is adjusted in association with movement of at least a portion of the housings 110 and 120 in a first direction, wherein the display region includes a first portion (e.g., the first portion 130a in FIG. 2) that is fixedly exposed to the outside regardless of whether the at least a portion of the housings 110 and 120 moves in the first direction, and a second portion (e.g., the second portion 130b in FIG. 2) extending from one end of the first portion 130a and being pulled out from an internal space of the housings 110 and 120 in association with the movement of the at least a portion of the housings 110 and 120 in the first direction, thereby being exposed to the outside, a main bracket (e.g., the main bracket 310 in FIG. 3) disposed in the internal space of the housings 110 and 120 and configured to support the first portion 130a of the rollable display 130, a roller member (e.g., the roller member 320 in FIG. 3) disposed in the first direction from the main bracket 310 and arranged in a third direction perpendicular to the first direction, at least one folding support member (e.g., the folding support members 340 in FIG. 3) disposed between the main bracket 310 and the roller member 320 and configured to support the second portion of the rollable display 130, wherein the folding support member 340 includes a first support member (e.g., the first support member 810 in FIG. 8) coupled to be rotatable from one side surface of the main bracket 310 and disposed to form an angle in a predetermined first range with the first side surface of the main bracket 310 when the electronic device 100 is in a first state in which the second portion 130b of the rollable display 130 is visually exposed in the outside and disposed to face the one side surface of the main bracket 310 when the electronic device 100 is in a second state in which the second portion 130b of the rollable display 130 is not visually exposed in the outside, and a second support member (e.g., the second support member 820 of FIG. 8) coupled to be rotatable from one end of the first support member 810, disposed to form an angle in a predetermined range with the first support member 810 when the electronic device 100 is in the first state, and disposed parallel with the first support member 810 when the electronic device 100 is in the second state, a circuit board (e.g., the circuit board 360 in FIG. 3) disposed to overlap at least a portion of the main bracket 310, at least one electronic component (e.g., the electronic component 330 in FIG. 3) disposed adjacent to the roller member 320, and a flexible printed circuit board (FPCB) (e.g., the FPCB 390 in FIG. 3) electrically connecting the circuit board 360 and the electronic component 330, wherein the FPCB 390 is disposed to pass through the first support member 810 and the second support member 820 of the folding support member 340 and extends from a portion of the circuit board 360 to a portion of the electronic component 330.

According to an embodiment, the first support member 810 may include a first support surface disposed to face the second portion of the rollable display 130, a first side surface extending from one end of the first support surface and disposed to face the one side surface of the main bracket 310 when the electronic device 100 is the second state, and a second side surface extending from the other end of the first support surface and disposed to face the second support member 820 when the electronic device 100 is in the second state, and the second support member 820 may include a second support surface disposed to face the second portion of the rollable display 130, a third side surface extending from one end of the second supporting surface and disposed to face the second side surface of the first support member 810 when the electronic device 100 is in the second state, and a fourth side surface extending from the other end of the second support surface and disposed to face the roller member 320 when the electronic device 100 is in the second state.

According to an embodiment, at least a portion of the FPCB 390 may be disposed to pass through the first side surface of the first support member 810 and the fourth side surface of the second support member 820.

According to an embodiment, at least a portion of the FPCB 390 may be attached to each of the first side surface of the first support member 810 and the fourth side surface of the second support member 820 by an adhesive member.

According to an embodiment, at least a portion of the FPCB 390 may be disposed to pass through the second side surface of the first support member 810 and the third side surface of the second support member 820.

According to an embodiment, at least a portion of the FPCB 390 may be attached to each of the second side surface of the first support member 810 and the third side surface of the second support member 820 by an adhesive member.

According to an embodiment, the folding support member 340 may include a hinge member configured to couple one end of the first support member 810 and one end of the second support member 820 to be rotatable relative to each other, and the FPCB 390 includes a bending region that is bent in association with the movement of the folding support member 340 in a portion adjacent to the hinge member, wherein the bending region is disposed to have a wavy shape without being attached to the folding support member 340.

According to an embodiment, a laminated structure of the FPCB 390 may include at least one ground layer on which a metal pattern electrically connected to a ground is provided, and the ground layer may include at least one slit formed by removing at least a portion of the metal pattern from the bending region of the FPCB 390.

According to an embodiment, the slit may be formed in a z-axis direction vertically penetrating the second portion of the rollable display 130 when the electronic device 100 is in the first state.

According to an embodiment, the FPCB 390 may include an attachment region attached to at least some side surfaces of the folding support member 340, and a metal material forming the metal pattern may be formed in the attachment region of the FPCB 390 to correspond to the entire area of the attachment region without a specific pattern.

According to an embodiment, the FPCB 390 may include an attachment region attached to at least some side surfaces of the folding support member 340, and at least one electronic component 330 may be disposed in the attachment region of the FPCB 390.

According to an embodiment, a cross-sectional structure obtained by cutting each of the first support member 810 and the second support member 820 may have any one shape among a circular shape, an elliptical shape, a quadrilateral shape, a circular shape in which an opening is formed in one direction, a circular shape, an elliptical shape in which an opening is formed in one direction, a quadrilateral shape in which an opening is formed in one direction, and a shape in which a quadrilateral shape and a circular shape are combined.

According to an embodiment, the folding support member 340 may further include a third support member (e.g., the third support member 830 in FIG. 13) coupled to be rotatable from one side surface of the main bracket 310, disposed to be symmetrical with the first support member 810 in association with the movement of the first support member 810 when the electronic device 100 is in the first state, and disposed to face the one side surface of the main bracket 310 when the electronic device 100 is in the second state, and a fourth support member (e.g., the fourth support member 840 of FIG. 13) coupled to be rotatable from one end of the third support member 830, dispose to be symmetrical with the second support member 820 when the electronic device 100 is in the first state, and disposed parallel with the third support member 830 when the electronic device 100 is in the second state.

According to an embodiment, the FPCB 390 is disposed to pass through all of the first to fourth support members 810, 820, 830, and 840, so that at least some lines provided in the FPCB 390 may form a coil wound a predetermined number of times when viewed in the z-axis direction vertically penetrating the second portion of the rollable display 130, and the at least some lines provided in the FPCB 390 may be used as antennas for wireless communication in a predetermined frequency band by forming the coil.

According to an embodiment, the at least some lines provided in the FPCB 390 may be used as a wireless charging antenna.

According to an embodiment, the at least some lines provided in the FPCB 390 may be used as a magnetic secure transmission (MST) antenna.

According to an embodiment, the at least some lines provided in the FPCB 390 may be used as a near field communication (NFC) antenna.

According to an embodiment, the FPCB 390 may be disposed to pass through a support surface of each of the first to the fourth support members 810, 820, 830, and 840, and the support surface of each of the first to fourth support members 810, 820, 830, and 840 may be disposed to face the second portion of the rollable display 130.

According to an embodiment, at least one of a speaker module, a camera module, and an antenna module may be disposed on the electronic component 330.

According to an embodiment, the antenna module may be an antenna module for cellular communication or short-range communication.

Figure 3:
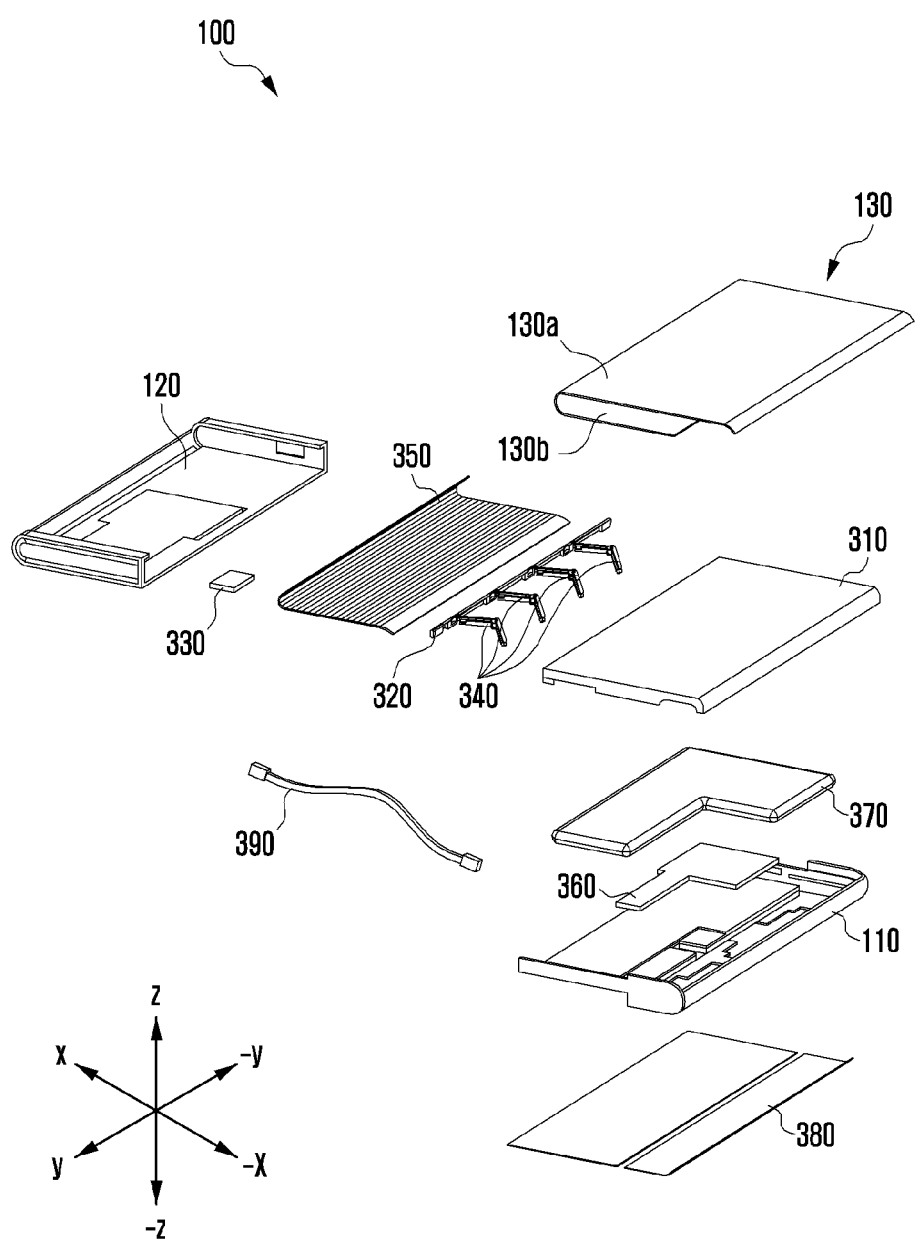
FIG. 3 is an exploded perspective view of an electronic device according to an embodiment of the disclosure.

FIG. 3 is an exploded perspective view of an electronic device according to an embodiment of the disclosure.

The electronic device 100 illustrated in FIG. 3 may include an embodiment that is at least partially similar to or different from the electronic device 100 illustrated in FIGS. 1 and 2. Hereinafter, only the features of the electronic device 100 that have not been described with reference to FIGS. 1 and 2 or are changed from those of FIGS. 1 and 2 will be described with reference to FIG. 3.

Referring to FIG. 3, the internal space of the first housing 110 and the internal space of the second housing 120 according to an embodiment may be at least partially connected to each other and may substantially form a single space.

According to an embodiment, at least some components disposed in the internal space of the first housing 110 may be disposed only in the internal space defined by the first housing 110, or may be disposed in the internal space defined by the first housing 110 and the internal space defined by the second housing 120.

According to an embodiment, at least some components disposed in the internal space of the second housing 120 may be disposed only in the internal space defined by the second housing 120, or may be disposed in the internal space defined by the first housing 110 and the internal space defined by the second housing 120.

According to an embodiment, the internal space defined by the first housing 110 and the second housing 120 may be expanded as the second housing 120 moves in the first direction (the x direction). According to an embodiment, the internal space expanded as the second housing 120 moves in the first direction (the x direction) is disposed to be surrounded by the second side member 110*b* of the first housing 110, and thus may not be visually exposed in the outside.

According to an embodiment, a main bracket 310, a battery 370, and/or a circuit board 360 (e.g., the main circuit board) may be disposed in the internal space defined by the first housing 110, and at least some of these components may be disposed to extend into the internal space defined by the second housing 120. According to an embodiment, the battery 370 and the circuit board 360 may be disposed to at least partially overlap the main bracket 310. In some embodiments, at least one of the battery 370 and the main circuit board 360 may be accommodated in a space (not illustrated) defined by the main bracket 310, for example, a groove.

According to an embodiment, the main bracket 310 may provide a space in which the battery 370 and the circuit board 360 are disposed, and may perform a function of supporting a first portion 130*a* of the rollable display 130. According to an embodiment, one side surface (e.g., the one side surface 312 in FIG. 8) of the main bracket 310 may be coupled to the folding support member 340.

According to an embodiment, the battery 370 is a device for supplying power to at least one component of the electronic device 100, and may include, for example, a non-rechargeable primary battery, a rechargeable secondary battery, or a fuel cell. At least a portion of the battery 370 may be disposed on substantially the same plane as, for example, the circuit board 360.

According to an embodiment, on the circuit board 360 (e.g., a printed circuit board (PCB), a printed board assembly (PBA), a flexible PCB (FPCB), or a rigid-flexible PCB (RFPCB)), a processor (not illustrated), a memory (not illustrated), and/or an interface (not illustrated) may be mounted. The processor (not illustrated) may include one or more of, for example, a central processing unit, an application processor, a graphics processor, an image signal processor, a sensor hub processor, or a communication processor.

According to an embodiment, the memory (not illustrated) may include, for example, a volatile memory or a nonvolatile memory.

According to an embodiment, the interface (not illustrated) may include, for example, a high-definition multimedia interface (HDMI), a universal serial bus (USB) interface, a secure digital (SD) card interface, and/or an audio interface. The interface may electrically or physically connect, for example, the electronic device 100 to an external electronic device 100 and may include a USB connector, an SD card/an MMC connector, or an audio connector.

According to an embodiment, an antenna (not illustrated) may be disposed inside the first housing 110. For example, the antenna may be disposed between the main bracket 310 and a rear cover 380 of the first housing 110. The antenna may include, for example, a near field communication (NFC) antenna, a wireless charging antenna, and/or a magnetic secure transmission (MST) antenna. The antenna may perform short-range communication with, for example, an external device, or may transmit/receive power required for charging to/from an external device in a wireless manner.

According to an embodiment, in the internal space defined by the second housing 120, a roller member 320, a folding support member 340, a hinge rail 350, and at least one electronic component 330 may be disposed, and at least some of these components may be disposed to extend into the internal space defined by the first housing 110.

According to an embodiment, the electronic component 330 may include at least one of an antenna module, a speaker module, a sensor module, and a sub-circuit board. According to an embodiment, the electronic component 330 may be disposed adjacent to at least a portion of the third side member 120a or the roller member 320. According to an embodiment, the electronic component 330 may be electrically connected to the circuit board 360 via the FPCB 390. According to an embodiment, the sensor module may include at least one of a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an indicator. According to an embodiment, the antenna module may include a patch antenna configured to perform wireless communication in a predetermined band for wireless communication or a predetermined high-frequency band (e.g., the mmWave band).

According to an embodiment, the roller member 320 may have a bar shape or a cylindrical (or semi-circular column) shape arranged in a third direction (the y direction). The roller member 320 may move in the second direction (the −x direction) in which the main bracket 310 is located in association with the movement of the second housing 120, or may move in the first direction (the x direction) opposite to that of the main bracket 310. For example, the roller member 320 may move in the first direction (the x direction) in association with the sliding movement of the second housing 120 in the first direction (the x direction), and the second housing 120 may move in the second direction (the −x direction) in association with the sliding movement of the second housing 120 in the second direction (the −x direction).

According to an embodiment, the folding support member 340 may perform a function of supporting the second portion 130b of the rollable display 130 by supporting at least a portion of the hinge rail 350 in the second state. According to an embodiment, as will be described later with reference to FIG. 8, the folding support member 340 may include a first support member 810 and a second support member 820 coupled to be rotatable relative to each other. According to an embodiment, in the first state, the folding support member 340 may be disposed such that the first support member 810 and the second support member 820 face each other, wherein no angle may be formed between the first support member 810 and the second support member 820. According to an embodiment, in the second state, the folding support member 340 may perform a function of supporting the second portion 130b of the rollable display 130 because the first support member 810 and the second support member 820 are capable of forming an angle in a predetermined range and at least a portion of the hinge rail 350 is supported by the support surface of each of the first support member 810 and the second support members 820.

According to an embodiment, the folding support member 340 may perform a function of providing a route through which the FPCB 390 moves. For example, the folding support member 340 may provide a function of providing a route that enables the circuit board 360 and the electronic component 330 to be electrically connected to each other by the FPCB 390 and a function of protecting the FPCB 390 from an external impact.

According to an embodiment, the hinge rail 350 may support a portion (e.g., the second portion 130b) of the rollable display 130 while being supported by the folding support member 340. According to an embodiment, the hinge rail 350 may have a form in which a plurality of bars are rotatably coupled to each other.

According to an embodiment, at least one FPCB 390 electrically connecting the circuit board 360 and the electronic component 330 to each other may be disposed in the internal space extending from the first housing 110 and the second housing 120. For example, the FPCB 390 may be disposed to extend from a portion of the circuit board 360 to the electronic component 330.

Figure 9A:
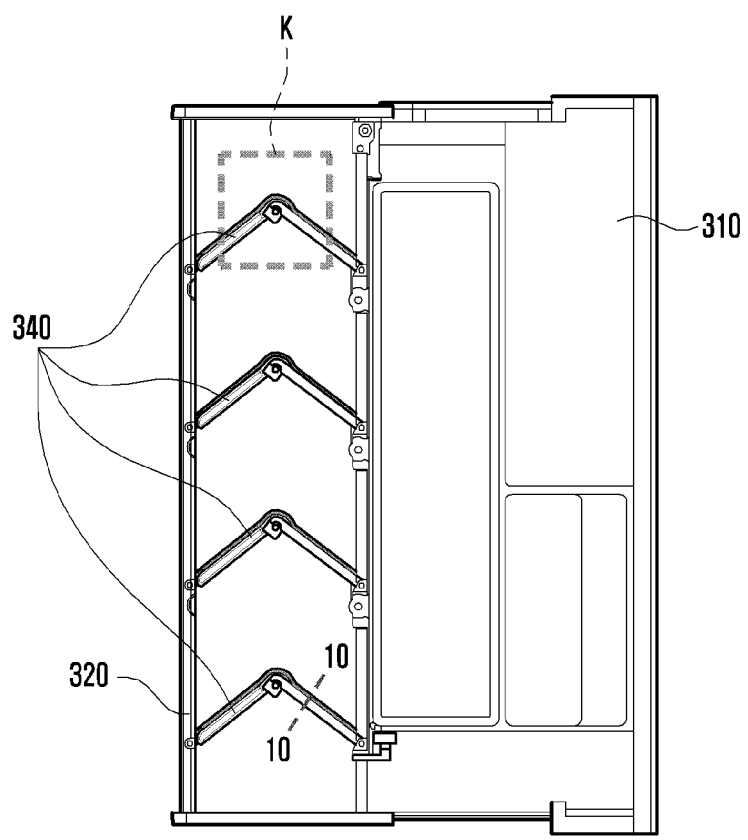
FIG. 9A is a schematic diagram illustrating an arrangement of a folding support member and an FPCB in a second state of an electronic device is provided according to an embodiment of the disclosure.
Figure 9B:
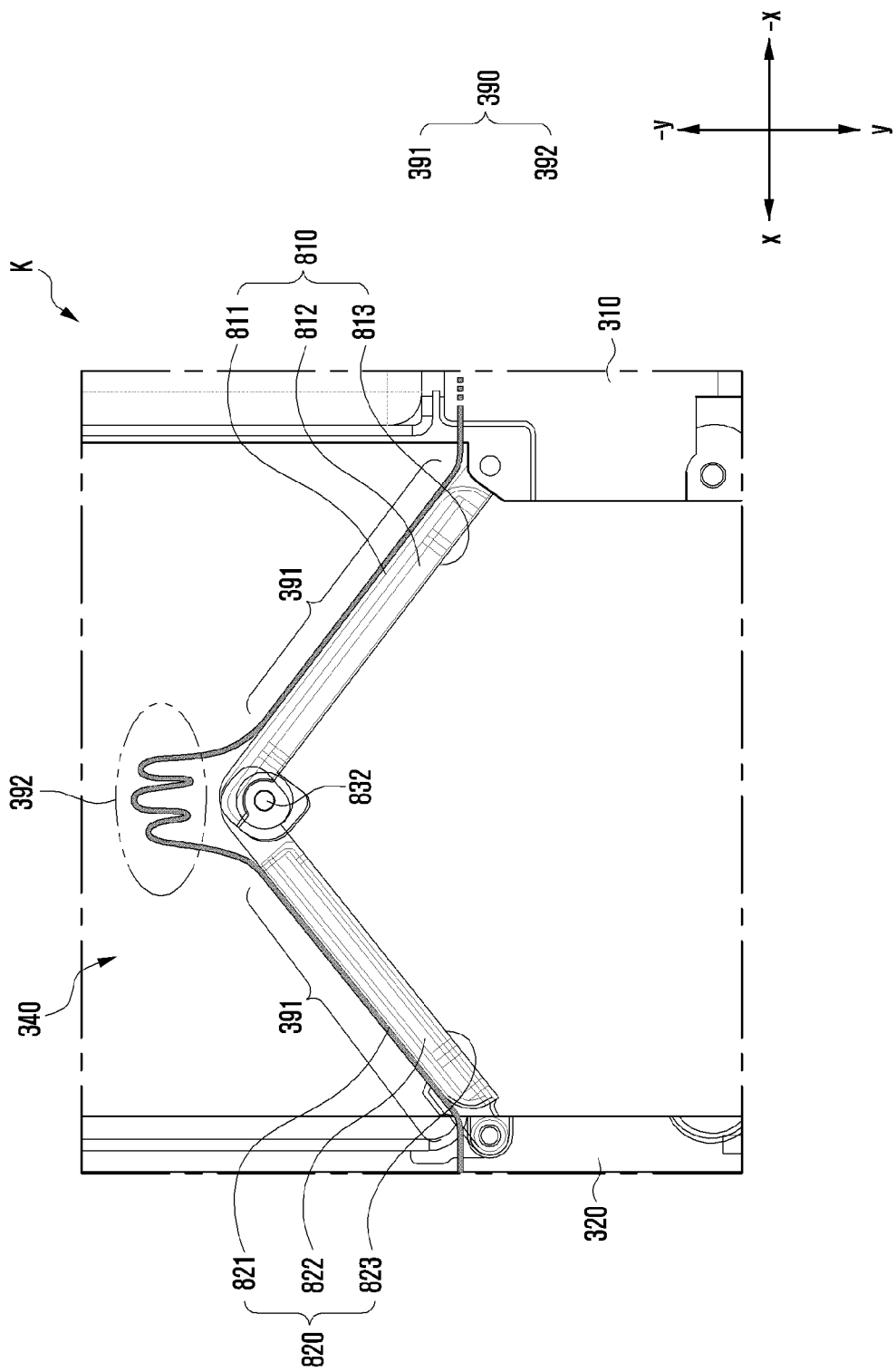
FIG. 9B is a detailed enlarged view of a k-region illustrated in FIG. 9A according to an embodiment of the disclosure.

According to an embodiment, when extending from a portion of the circuit board 360 to the electronic component 330, the FPCB 390 may be disposed to pass through a portion of the battery 370 and at least one surface (e.g., at least some surface among the first to fourth side surfaces 811, 813, 821, and 823, the first support surface 812, and the second support surface 822 in FIG. 9B) of the folding support member 340.

According to an embodiment, the rear surface of the first housing 110 (e.g., the surface oriented in the −z direction in the first housing 110) may be coupled to the rear cover 380. According to an embodiment, the rear cover 380 may be made of an opaque material. According to an embodiment, the rear cover 380 may be made of, for example, coated or colored glass, ceramic, polymer, metal (e.g., aluminum, stainless steel (STS), or magnesium), or a combination of two or more of these materials. According to an embodiment, the rear cover 380 may be coupled to the side members of the first housing 110 (e.g., the side members 110a and 110b in FIG. 2) or may be configured integrally with the side members 110a and 110b or the first housing 110.

Although not illustrated, the electronic device 100 may further include a second rear cover (not illustrated) coupled to the rear surface of the second housing 120 (e.g., the surface oriented in the −z direction in the second housing 120). In this case, the second rear cover may be made of substantially the same material as the rear cover 380.

Figure 4:
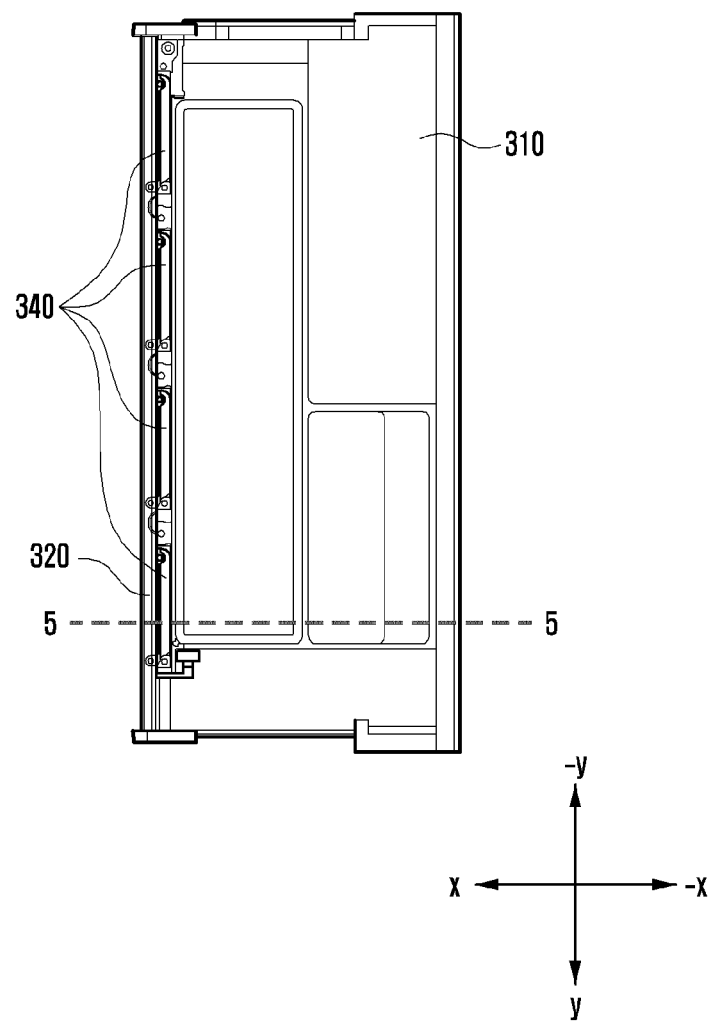
FIG. 4 is a front view illustrating a display support member in a first state of an electronic device according to an embodiment of the disclosure.

FIG. 4 is a front view illustrating a display support member in a first state (e.g., a contracted state) of an electronic device according to an embodiment of the disclosure.

Figure 5:
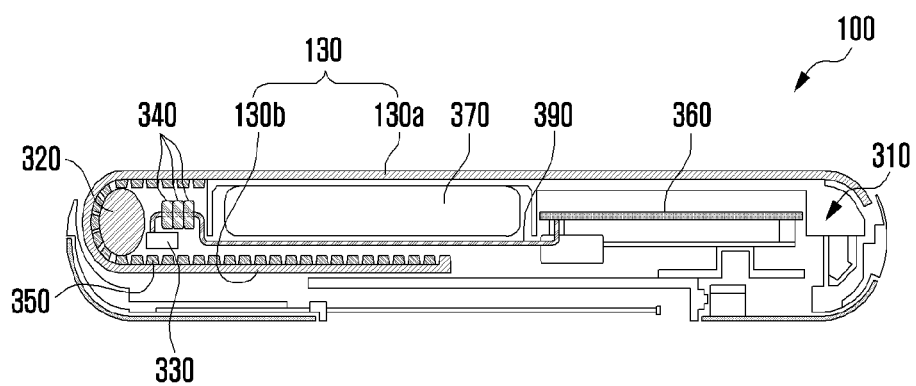
FIG. 5 is a cross-sectional view schematically illustrating a cross section of an electronic device in a first state according to an embodiment of the disclosure.
Figure 5:
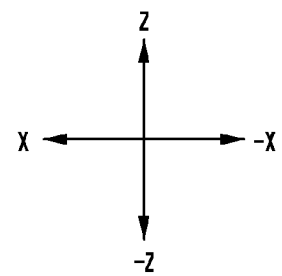

FIG. 5 is a cross-sectional view illustrating an electronic device in a first state (e.g., the contracted state) according to an embodiment of the disclosure. For example, FIG. 5 may be a cross-sectional view of the electronic device 100 taken along line 5-5 in FIG. 4.

The electronic device 100 illustrated in FIGS. 4 and 5 may include an embodiment that is at least partially similar to or different from the electronic device 100 illustrated in FIGS. 1 to 3. Hereinafter, only the features of the electronic device 100 that have not been described with reference to FIGS. 1 to 3 or are changed from those of FIGS. 1 to 3 will be described with reference to FIGS. 4 and 5.

Referring to FIGS. 4 and 5, in the first state according to an embodiment, in the rollable display 130, the first portion 130a may be visually exposed in the outside, and the second portion 130b may not be visually exposed in the outside by being disposed in the internal space of the housing 120. For example, in the first state, the first portion 130a of the rollable display 130 may be visually visible in the front direction of the electronic device 100 (the z direction).

According to an embodiment, the first portion 130a of the rollable display 130 may be supported by the support surface of the main bracket 310. According to an embodiment, although not illustrated, at least one support plate (not illustrated) may be disposed between the support surface of the main bracket 310 and the first portion 130a of the rollable display 130. For example, the support plate may include a metal plate (not illustrated) for performing a heat dissipation function.

According to an embodiment, the second portion 130b of the rollable display 130 may be disposed in the internal space of the second housing 120 by the hinge rail 350.

According to an embodiment, the hinge rail 350 may perform a function of guiding the movement of the second portion 130b of the rollable display 130. For example, the second portion 130b of the rollable display 130 may be disposed in the internal space of the second housing 120 according to the movement of the hinge rail 350.

According to an embodiment, in the first state, substantially all the portions of the hinge rail 350 may be disposed in the internal space of the second housing 120 to be oriented toward the rear surface of the electronic device 100 (in the −z direction). According to an embodiment, in the first state, the second portion 130b of the rollable display 130 may be in the internal space of the second housing 120 since the hinge rail 350 is disposed in the internal space of the second housing 120.

According to an embodiment, the folding support member 340 may perform a function of supporting the second portion 130b of the rollable display 130 by supporting the hinge rail 350. According to an embodiment, in the first state, the folding support member 340 may be in a folded state and may be disposed parallel with one side surface of the main bracket 310.

According to an embodiment, the electronic component 330 may be disposed adjacent to the roller member 320 and may be electrically connected to the circuit board 360 via the FPCB 390.

According to an embodiment, when extending from a portion of the circuit board 360 to the electronic component 330, the FPCB 390 may be disposed to pass through a portion of the battery 370 and a side surface of the folding support member 340.

According to an embodiment, when extending from the circuit board 360 to the electronic component 330, the FPCB 390 may be assembled to be bent at least once. For example, the FPCB 390 may be bent at least once at the boundary between the circuit board 360 and the battery 370. For example, the FPCB 390 may be bent at least once at the boundary between the battery 370 and the folding support member 340. For example, the FPCB 390 may be bent in a folding region of the folding support member 340 (e.g., a portion adjacent to the hinge member 832 in FIG. 8). For example, the FPCB 390 may be bent at least once at the boundary between the folding support member 340 and the roller member 320. For example, the FPCB 390 may be bent at least once at the boundary between the roller member 320 and the electronic component 330.

According to various embodiments, the bent position and/or the bent direction of the FPCB 390 is not limited to the illustrated form, and may be variously changed.

According to an embodiment, when extending from the circuit board 360 to the folding support member 340, the FPCB 390 may be disposed to pass through the lower portion of the battery 370 (e.g., in the −z direction). In some embodiments, although not illustrated, when extending from the main circuit board 360 to the folding support member 340, the FPCB 390 may be disposed to pass through the upper portion of the battery 370 (e.g., in the z direction).

Figure 6:
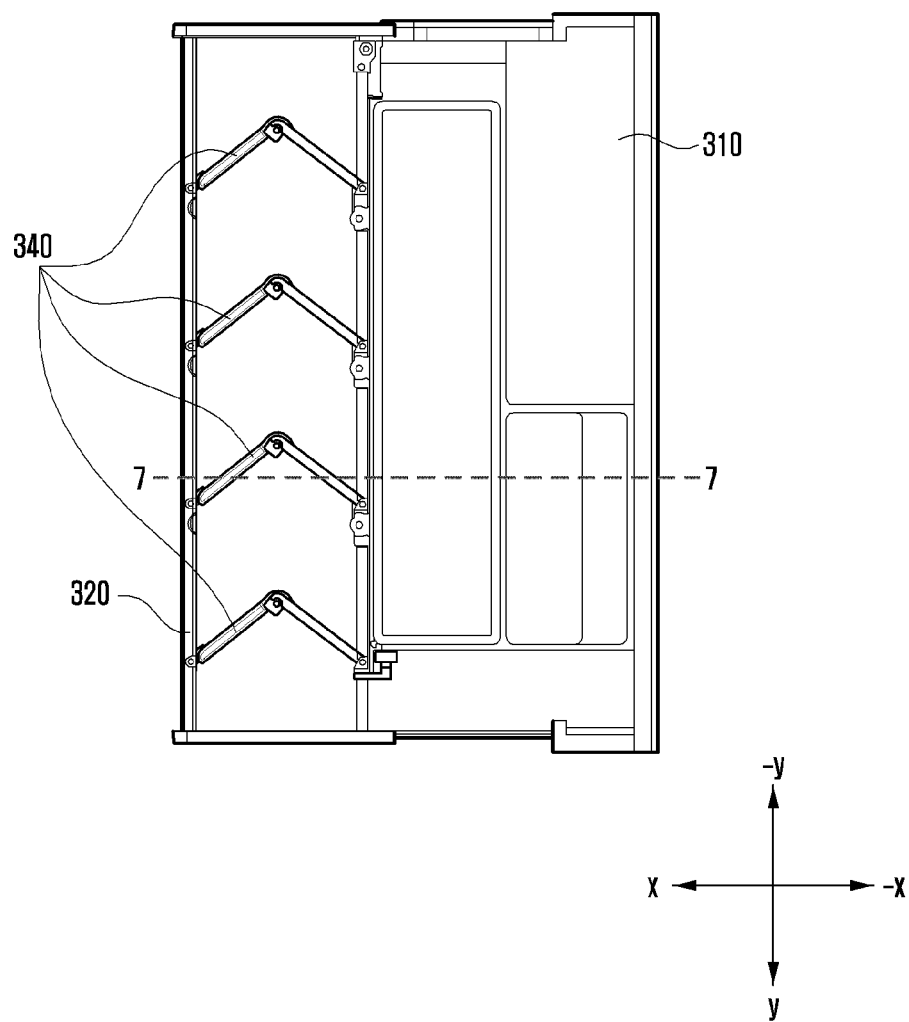
FIG. 6 is a front view illustrating a display support member in a second state of an electronic device according to an embodiment of the disclosure.

FIG. 6 is a front view illustrating a display support member in a second state (e.g., the expanded state) of an electronic device according to an embodiment of the disclosure.

Figure 7:
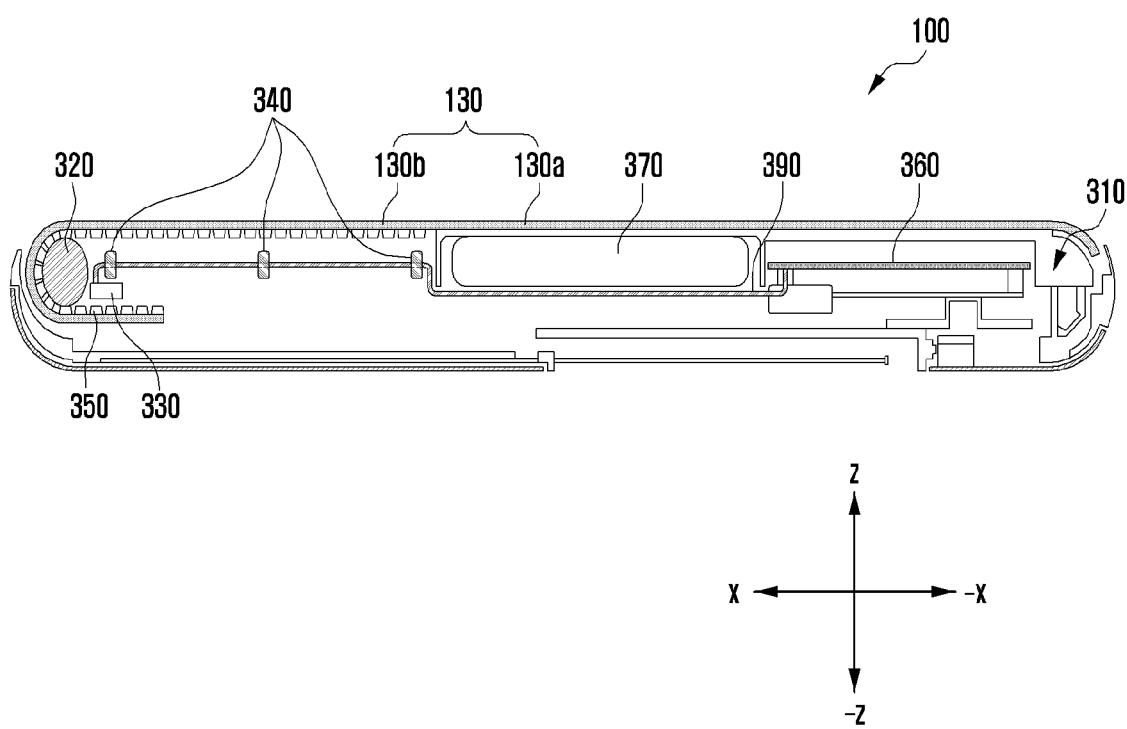
FIG. 7 is a cross-sectional view schematically illustrating a cross section of an electronic device in a second state according to an embodiment of the disclosure.

FIG. 7 is a cross-sectional view illustrating an electronic device in a second state (e.g., the expanded state) according to an embodiment of the disclosure. For example, FIG. 7 may be a cross-sectional view of the electronic device 100 taken along line 7-7 in FIG. 6.

The electronic device 100 illustrated in FIGS. 6 and 7 may include an embodiment that is at least partially similar to or different from the electronic device 100 illustrated in FIGS. 1 to 5. Hereinafter, only the features of the electronic device 100 that have not been described with reference to FIGS. 1 to 5 or are changed from those of FIGS. 1 to 5 will be described with reference to FIGS. 6 and 7.

Referring to FIGS. 6 and 7, in the second state according to an embodiment, in the rollable display 130, the first portion 130a and the second portion 130b may be visually exposed in the outside. For example, in the second state, the first portion 130a and the second portion 130b of the rollable display 130 may be visually visible in the front direction of the electronic device 100 (the z direction).

According to an embodiment, the first portion 130a of the rollable display 130 may be supported by the support surface of the main bracket 310. According to an embodiment, although not illustrated, at least one support plate (not illustrated) may be disposed between the support surface of the main bracket 310 and the first portion 130a of the rollable display 130. For example, the support plate may include a metal plate for performing a heat dissipation function.

According to an embodiment, the second portion 130b of the rollable display 130 may be supported by the hinge rail 350.

According to an embodiment, in the second state, in the hinge rail 350, portions corresponding to substantially the whole of the hinge rail 350 may be located in the internal space of the second housing 120 to be oriented toward the front surface (in the z direction), and may support the second portion 130b of the rollable display 130.

According to an embodiment, the hinge rail 350 may perform a function of guiding the movement of the second portion 130b of the rollable display 130. For example, the second portion 130b of the rollable display 130 may be pulled out according to the movement of the hinge rail 350, and may be disposed to be visually visible in the toward the front surface of the electronic device 100 (in the z direction) from the internal space of the second housing 120.

According to an embodiment, the folding support member 340 may perform a function of supporting the second portion 130b of the rollable display 130 by supporting the hinge rail 350. According to an embodiment, in the second state, the folding support member 340 may be in the unfolded state (e.g., the state in which the first support member 810 and the second support member 820 illustrated in FIG. 8 form a predetermined angle range A2).

According to an embodiment, the electronic component 330 may be disposed adjacent to the roller member 320 and may be electrically connected to the circuit board 360 via the FPCB 390.

According to an embodiment, when extending from a portion of the circuit board 360 to the electronic component 330, the FPCB 390 may be disposed to pass through a portion of the battery 370 and at least one surface (e.g., at least some surface among the first to fourth side surfaces 811, 813, 821, and 823, the first support surface 812, and the second support surface 822 in FIG. 9B).

Figure 8:
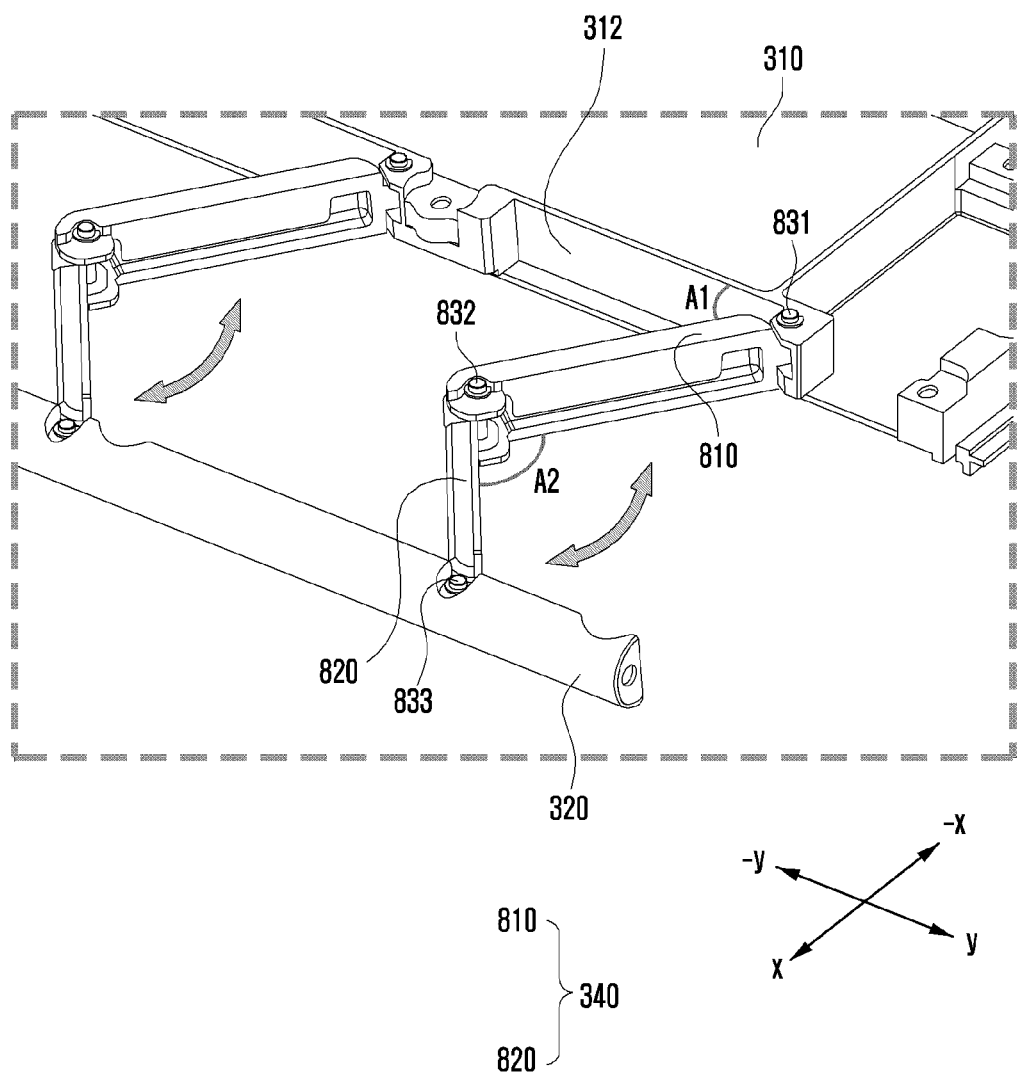
FIG. 8 is a perspective view illustrating a folding support member according to an embodiment of the disclosure.

FIG. 8 is a perspective view illustrating a folding support member according to an embodiment of the disclosure.

The electronic device 100 illustrated in FIG. 8 may include an embodiment that is at least partially similar to or different from the electronic device 100 illustrated in FIGS. 1 to 7. Hereinafter, only the features of the electronic device 100 that have not been described with reference to FIGS. 1 to 7 or are changed from those of FIGS. 1 to 7 will be described with reference to FIG. 8.

Referring to FIG. 8, the roller member 320 according to an embodiment may be disposed in a first direction of the main bracket 310 (the x direction).

According to an embodiment, the roller members 320 may be arranged in a third direction (the y direction) substantially perpendicular to the first direction (the x direction). For example, the roller member 320 may have a long rod shape in the third direction (the y direction). According to an embodiment, the shape of the cross-sectional surface of the roller member 320 may have a circular or semicircular shape.

According to an embodiment, a folding support member 340 configured to support the second portion 130b of the rollable display 130 may be disposed between the roller member 320 and the main bracket 310.

According to an embodiment, the folding support member 340 may include a first support member 810 and a second support member 820 that are rotatably coupled to each other.

According to an embodiment, the rollable display 130 may include a friction reduction member (not illustrate) on at least a part of the first support surface of the first support member 810 (e.g., the first support surface 812 in FIG. 9B) and/or the second support surface of the second support member 820 (e.g., the second support surface 822 in FIG. 9B) disposed to face the second portion (e.g., the second portion 130b in FIG. 7) of the rollable display 130. According to an embodiment, the friction reduction member may include at least one of a polyacetal or polyoxymethylene (POM) layer, an acetal layer, or a polytetrafluoroethylene (PTFE) layer. For example, when the first support member 810 and/or the second support member 820 come into contact with a hinge rail (e.g., the hinge rail 350 in FIG. 7), the frictional resistance with the hinge rail 350 can be reduced through the friction reduction member, which may be helpful to perform state switching (e.g., to a first state or a second state) of the electronic device 100.

According to an embodiment, the first support member 810 may be coupled to be rotatable from the one side surface 312 of the main bracket 310 by a hinge member 831 (or a joint member). According to an embodiment, in the second state, the first support member 810 may be disposed to form an angle A1 in a predetermined range with the one side surface 312 of the main bracket 310, and in the contracted state, the first support member 810 may be disposed to face the one side surface 312 of the main bracket 310.

According to an embodiment, one end of the second support member 820 may be coupled to be rotatable from one end of the first support member 810 by a hinge member 832 (or a joint member). According to an embodiment, in the second state, the second support member 820 may be disposed to form an angle A2 in a predetermined range with the first support member 810, and in the first state, the second support member 820 may be disposed parallel with the first support member 810. According to an embodiment, the other end of the second support member 820 may be coupled to be rotatable from a portion of the roller member 320 by a hinge member 833 (or a joint member).

According to an embodiment, the hinge members 831, 832, and 833 (or joint members) may include a rotating member such as a pin or a shaft.

FIG. 9A is a view schematically illustrating the FPCB 390 disposed via the folding support member 340 according to an embodiment of the disclosure. FIG. 9B is a view schematically illustrating the FPCB 390 disposed via the folding support member 340 according to an embodiment of the disclosure. For example, FIG. 9A may be a schematic view illustrating the arrangement of the folding support member 340 and the FPCB 390 according to the second state (e.g., the expanded state) of the electronic device 100. FIG. 9B may be an enlarged view illustrating the k-region of FIG. 9A in detail.

The electronic device 100 illustrated in FIGS. 9A and 9B may include an embodiment that is at least partially similar to or different from the electronic device 100 illustrated in FIGS. 1 to 8. Hereinafter, only the features of the electronic device 100 that have not been described with reference to FIGS. 1 to 8 or are changed from those of FIGS. 1 to 8 will be described with reference to FIGS. 9A and 9B.

Referring to FIGS. 9A and 9B, according to various embodiments, the surfaces of the folding support member 340 may be defined as follows.

According to an embodiment, the first support member 810 may include a first support surface 812 disposed to face the second portion 130b of the rollable display 130, a first side surface 811 extending from one end of the first support surface 812 and disposed to face the one side surface (e.g., the one side surface 312 in FIG. 8) of the main bracket 310 when the electronic device 100 is in the first state, and a second side surface 813 extending from the other end of the first support surface 812 and disposed to face the second side surface 813 when the electronic device 100 is in the first state.

According to an embodiment, the second support member 820 may include a second support surface 822 disposed to face the second portion 130b of the rollable display 130, a third side surface 823 extending from one end of the second support surface 822 and disposed to face the second side surface 813 of the first support member 810 when the electronic device 100 is in the first state, and a fourth side surface 821 extending from the other end of the second support surface 822 and disposed to face roller member 320 when the electronic device 100 is in the first state.

According to an embodiment, at least a portion of the FPCB 390 may be disposed to pass through the first side surface 811 of the first support member 810 and the fourth side surface 821 of the second support member 820. According to an embodiment, at least a portion of the FPCB 390 may be attached to each of the first side surface 811 of the first support member 810 and the fourth side surface 821 of the second support member 820 by an adhesive member (not illustrated). According to an embodiment, the adhesive member may include at least one of a heat-reactive adhesive material, a photo-reactive adhesive material, a general adhesive, and/or a double-sided tape.

In another embodiment, although not illustrated, at least a portion of the FPCB 390 may be disposed to pass through the second side surface 813 of the first support member 810 and the third side surface 823 of the second support member 820. For example, at least a portion of the FPCB 390 may be attached to each of the second side surface 813 of the first support member 810 and the third side surface 823 of the second support member 820 by an adhesive member.

In another embodiment, although not illustrated, at least a portion of the FPCB 390 may be disposed to pass through the first support surface 812 of the first support member 810 and the second support surface 822 of the second support member 820. For example, at least a portion of the FPCB 390 may be attached to each of the first support surface 812 of the first support member 810 and the second support surface 822 of the second support member 820 by an adhesive member.

According to an embodiment, the first support member 810 and the second support member 820 may perform a heat dissipation function of transferring heat generated from peripheral components. For example, the heat may be transferred to a portion of the FPCB 390 disposed to pass through the first support member 810 and the second support member 820, and the heat transferred to the FPCB 390 may be diffused via a hinge rail (e.g., the hinge rail 350 in FIG. 3) and a heat dissipation member (not illustrated) (e.g., a metal plate) disposed toward the rear surface of the rollable display 130 (in the −z direction). According to an embodiment, the heat dissipation member disposed toward the rear surface of the rollable display 130 (in the −z direction) may be a conductive plate (not illustrated), and may include at least one of steel use stainless (SUS) (e.g., stainless steel (STS)), Cu, Al, or CLAD (e.g., a laminated member in which SUS and Al are alternately disposed).

According to an embodiment, the bending region 392 of the FPCB 390 may be defined in a portion adjacent a hinge member (e.g., the hinge member 832 in FIG. 8) in which one end of the first support member 810 and one end of the second support member 820 are coupled to be rotatable relative to each other. According to an embodiment, the bending region 392 of the FPCB 390 is a region adjacent to the hinge member (e.g., the hinge member 832 in FIG. 8) of the folding support member 340 and may be bent in association with the movement of the folding support member 340. According to an embodiment, the bending region 392 of the FPCB 390 may be disposed to have a wavy shape without being attached to the folding support member 340. According to various embodiments, because the bending region 392 of the FPCB 390 is disposed to have a wavy shape without being attached to the folding support member 340, it is possible to reduce damage. For example, the bending region 392 of the FPCB 390 may be a region in which stress is concentrated during folding or unfolding since the bending region 392 is disposed adjacent to the hinge member (e.g., the hinge member 832 in FIG. 8) of the folding support member 340. In various embodiments, the damage of the FPCB 390 due to the stress can be reduced by designing the bending region 392 of the FPCB 390 to have a wavy shape.

According to an embodiment, the FPCB 390 may include at least one attachment region 391 and at least one bending region 392.

According to an embodiment, the at least one attachment region 391 of the FPCB 390 may be defined as a portion of the FPCB 390 to be attached to at least a partial surface of the folding support member 340. According to an embodiment, the at least one attachment region 391 of the FPCB 390 may include at least one surface (e.g., at least some surfaces among the first to fourth side surfaces 811, 813, 821, and 823, the first support surface 812, and the second support surface 822 in FIG. 9B) of the folding support member 340.

According to an embodiment, at least one bending region 392 of the FPCB 390 may be defined as a portion of the FPCB 390 adjacent to the hinge member (e.g., the hinge member 832 in FIG. 8) of the folding support member 340. According to an embodiment, the at least one bending region 392 of the FPCB 390 may be bent in association with the movement of the folding support member 340.

According to an embodiment, the electronic device 100 may include a connection member (e.g., a connector) other than the FPCB 390 to be electrically connected via the folding support member 340. For example, a coaxial cable connector or a board to board (B-to-B) connector may be included adjacent to and/or within the folding support member 340. For example, the circuit board 360 and the electronic component 330 may be electrically connected using a coaxial cable connector or a B-to-B connector.

Figure 10A:
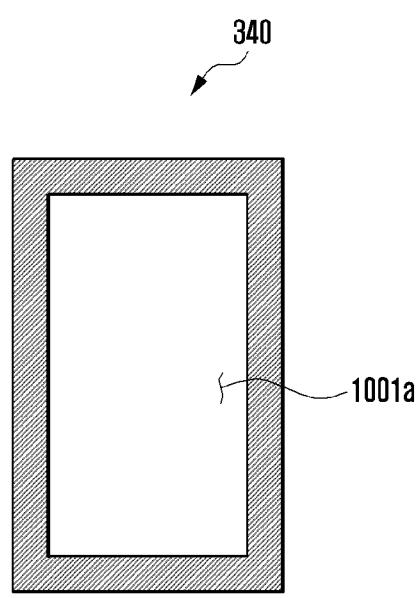
FIG. 10A is a cross-sectional view illustrating the folding support member taken along line 10-10 in FIG. 9A according to an embodiment of the disclosure.

FIG. 10A may be a cross-sectional view of a folding support member taken along line 10-10 in FIG. 9A according to an embodiment of the disclosure.

Figure 10B:
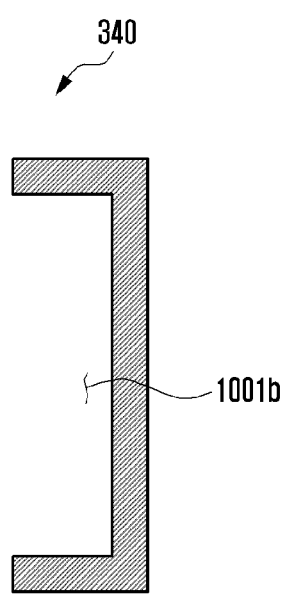
FIG. 10B is a cross-sectional view illustrating another embodiment of the folding support member taken along line 10-10 in FIG. 9A according to an embodiment of the disclosure.

FIG. 10B may be a cross-sectional view illustrating another embodiment of a folding support member taken along line 10-10 in FIG. 9A according to an embodiment of the disclosure.

Figure 10C:
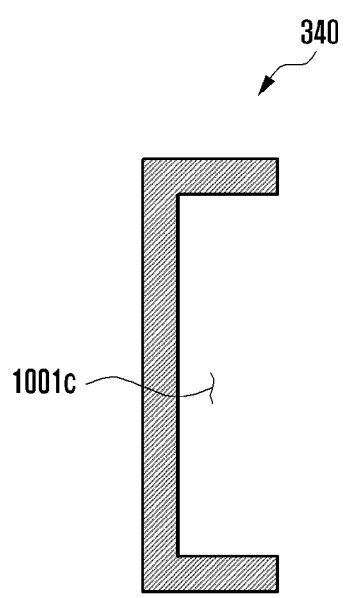
FIG. 10C is a cross-sectional view illustrating another embodiment of the folding support member taken along line 10-10 in FIG. 9A according to an embodiment of the disclosure.

FIG. 10C may be a cross-sectional view illustrating another embodiment of a folding support member taken along line 10-10 in FIG. 9A according to an embodiment of the disclosure.

Figure 10D:
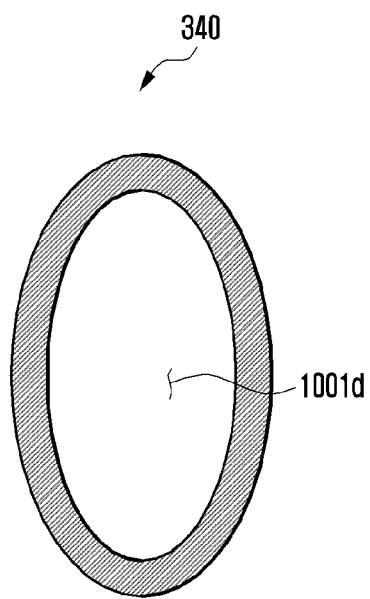
FIG. 10D is a cross-sectional view illustrating another embodiment of the folding support member taken along line 10-10 in FIG. 9A according to an embodiment of the disclosure.

FIG. 10D may be a cross-sectional view illustrating another embodiment of a folding support member taken along line 10-10 in FIG. 9A according to an embodiment of the disclosure.

Figure 10E:
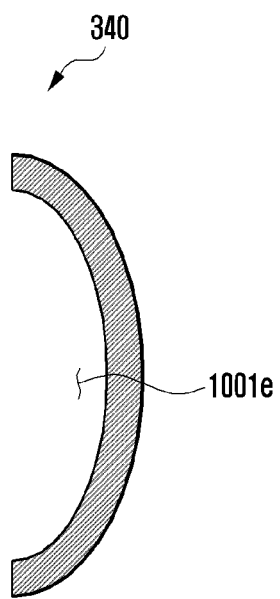
FIG. 10E is a cross-sectional view illustrating another embodiment of the folding support member taken along line 10-10 in FIG. 9A according to an embodiment of the disclosure.

FIG. 10E may be a cross-sectional view illustrating another embodiment of a folding support member taken along line 10-10 in FIG. 9A according to an embodiment of the disclosure.

Figure 10F:
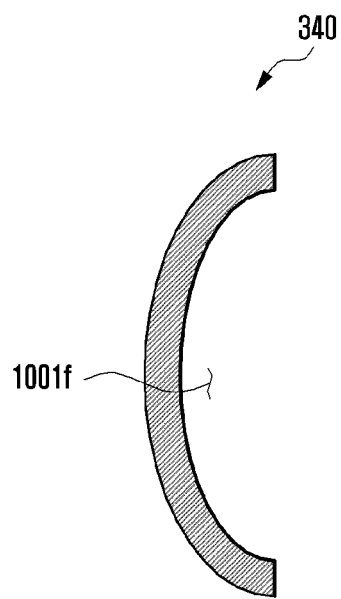
FIG. 10F is a cross-sectional view illustrating another embodiment of the folding support member taken along line 10-10 in FIG. 9A according to an embodiment of the disclosure.

FIG. 10F may be a cross-sectional view illustrating another embodiment of a folding support member taken along line 10-10 in FIG. 9A according to an embodiment of the disclosure.

Figure 10G:
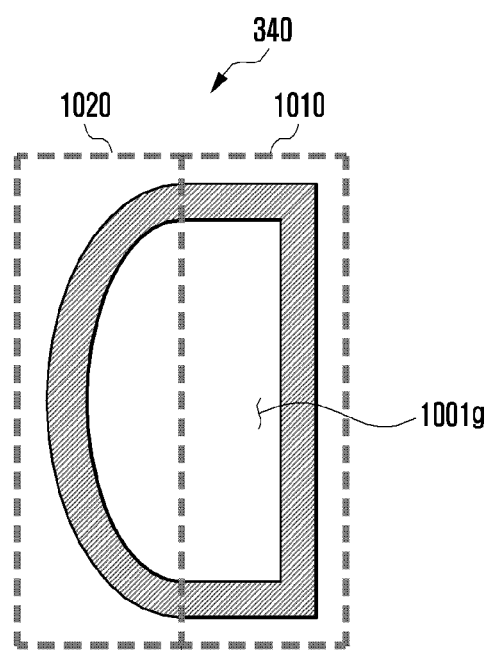
FIG. 10G is a cross-sectional view illustrating another embodiment of the folding support member taken along line 10-10 in FIG. 9A according to an embodiment of the disclosure.

FIG. 10G may be a cross-sectional view illustrating another embodiment of a folding support member taken along line 10-10 in FIG. 9A according to an embodiment of the disclosure.

The electronic device 100 illustrated in FIGS. 10A to 10G may include an embodiment that is at least partially similar to or different from the electronic device 100 illustrated in FIGS. 1 to 8, 9A, and 9B. Hereinafter, only the features of the electronic device 100 that have not been described with reference to 1 to 8, 9A, and 9B or are changed from those of 1 to 8, 9A, and 9B will be described with reference to FIGS. 10A to 10G.

According to various embodiments, as illustrated in FIGS. 10A to 10G, the cross-sectional structure of the folding support member 340 may be designed in various ways. For example, a cross-sectional structure obtained by cutting each of the first support member 810 and the second support member 820 may have any one shape among a circular shape, an elliptical shape, a quadrilateral shape, a circular shape in which an opening is formed in one direction, an elliptical shape in which an opening is formed in one direction, and a quadrilateral shape in which an opening is formed in one direction.

According to an embodiment, as illustrated in FIG. 10A, a cross-sectional structure obtained by cutting each of the first support member 810 and the second support member 820 may have a quadrilateral shape. The space 1001a defined by each of the first support member 810 and the second support member 820 may provide a route in which the FPCB 390 (or a coaxial cable) is disposed.

In another embodiment, as illustrated in FIG. 10B, a cross-sectional structure obtained by cutting each of the first support member 810 and the second support member 820 may have a quadrilateral shape in which an opening may be formed in one direction (e.g., the x direction). The space

1001b defined by each of the first support member 810 and the second support member 820 may provide a route in which the FPCB 390 (or a coaxial cable) is disposed.

In another embodiment, as illustrated in FIG. 10C, a cross-sectional structure obtained by cutting each of the first support member 810 and the second support member 820 may have a quadrilateral shape in which an opening may be formed in another direction (e.g., the −x direction). The space 1001c defined by each of the first support member 810 and the second support member 820 may provide a route in which the FPCB 390 (or a coaxial cable) is disposed.

In another embodiment, as illustrated in FIG. 10D, a cross-sectional structure obtained by cutting each of the first support member 810 and the second support member 820 may have a quadrilateral shape, a circular shape, or an elliptical shape. The space 1001d defined by each of the first support member 810 and the second support member 820 may provide a route in which the FPCB 390 (or a coaxial cable) is disposed.

In another embodiment, as illustrated in FIG. 10E, a cross-sectional structure obtained by cutting each of the first support member 810 and the second support member 820 may have a circular shape or an elliptical shape in which an opening may be formed in one direction (e.g., the x direction). The space 1001e defined by each of the first support member 810 and the second support member 820 may provide a route in which the FPCB 390 (or a coaxial cable) is disposed.

In another embodiment, as illustrated in FIG. 10F, a cross-sectional structure obtained by cutting each of the first support member 810 and the second support member 820 may have a circular shape or an elliptical shape in which an opening may be formed in another direction (e.g., the −x direction). The space 1001f defined by each of the first support member 810 and the second support member 820 may provide a route in which the FPCB 390 (or a coaxial cable) is disposed.

In another embodiment, as illustrated in FIG. 10G, a cross-sectional structure obtained by cutting each of the first support member 810 and the second support member 820 may have a shape in which a circular shape and a quadrilateral shape are combined. The space 1001g defined by each of the first support member 810 and the second support member 820 may provide a route in which the FPCB 390 (or a coaxial cable) is disposed. According to another embodiment, a cross-section of each of the first support member 810 and the second support member 820 may include a first portion 1010 having a quadrilateral shape and a second portion 1020 extending from the first portion 1010 and having a circular or elliptical shape. The first portion 1010 may be a portion in which the first support member 810 and the second support member 820 disposed to face each other when the electronic device 100 is in the first state. For example, the first portion 1010 may include a second side surface (e.g., the second side surface 813 in FIG. 9B) of the first support member 810 disposed to face the second support member 820 when the electronic device 100 is in the first state and a third side surface (e.g., the third side surface 823 in FIG. 9B) of the second support member 820 disposed to face the second side surface 813 of the first support member 810 when the electronic device 100 is in the first state. The second portion 1020 may include a first side surface (e.g., the first side surface 811 in FIG. 9B) of the first support member 810 disposed to face one side surface (e.g., the one side surface 312 in FIG. 8) of the main bracket 310 when the electronic device 100 is in the first state, and a fourth side surface (e.g., the fourth side surface 821 in FIG. 9B) of the second support member 820 disposed to face the roller member (e.g., the roller member 320 in FIG. 9B) when the electronic device 100 is in the first state.

Figure 11:
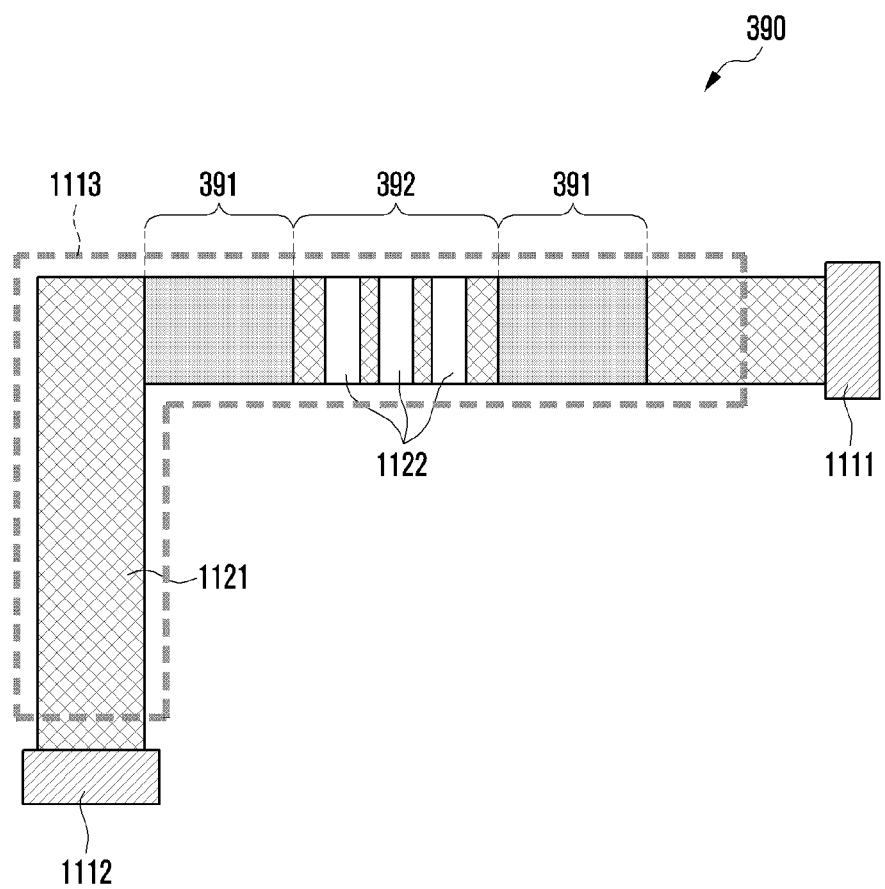
FIG. 11 is a plan view schematically illustrating an FPCB according to an embodiment of the disclosure.

FIG. 11 may be a plan view schematically illustrating an FPCB 390 according to an embodiment of the disclosure.

Figure 12:
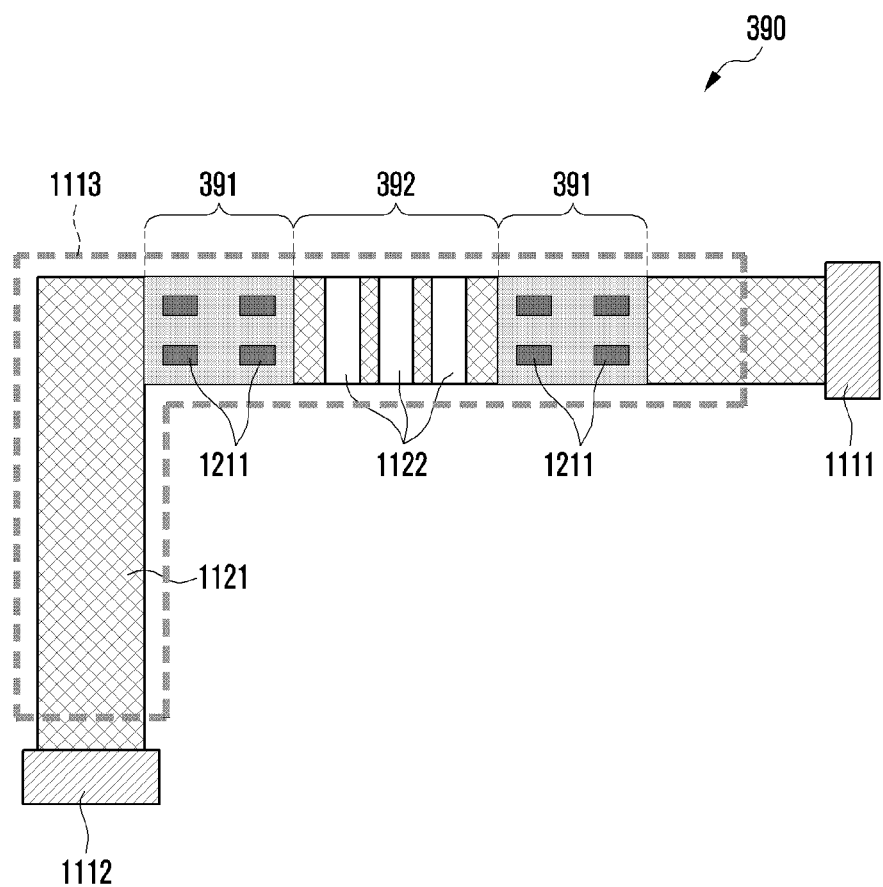
FIG. 12 is a plan view schematically illustrating an FPCB according to an embodiment of the disclosure.

FIG. 12 may be a plan view schematically illustrating an FPCB 390 according to another embodiment of the disclosure.

The electronic device 100 illustrated in FIGS. 11 and 12 may include an embodiment that is at least partially similar to or different from the electronic device 100 illustrated in FIGS. 1 to 8, 9A, 9B, and 10A to 10G. Hereinafter, only the features of the electronic device 100 that have not been described with reference to FIGS. 1 to 8, 9A, 9B, and 10A to 10G or are changed from those of FIGS. 1 to 8, 9A, 9B, and 10A to 10G will be described with reference to FIGS. 11 and 12.

Referring to FIG. 11, a first connector region 1111 connected to the main circuit board 360 may be disposed at one end of the FPCB 390 according to an embodiment, and a second connector region 1112 connected to the electronic component 330 may be disposed at the other end of the FPCB 390.

According to an embodiment, between the first connector region 1111 and the second connector region 1112 of the FPCB 390, an extension region 1113 extending to pass through the battery 370, the folding support member 340, and/or the rolling member 320 from the circuit board 360 may be disposed.

According to an embodiment, although not illustrated, at least a portion of the extension region 1113 of the FPCB 390 may be bent and assembled to the electronic device 100.

According to an embodiment, the extension region 1113 of the FPCB 390 may include at least one attachment region 391 attached to at least one surface of the folding support member 340 (e.g., at least some surfaces among the first to fourth side surfaces 811, 813, 821, and 823 in FIG. 9B, the first support surface 812, and the second support surface 822), and at least one bending region 392 adjacent to the hinge member (e.g., the hinge member 832 in FIG. 8) of the folding support member 340.

TABLE 1

| L1 | | Coverlay (removing GND fill) | | |
|---|---|---|---|---|
| L2 | | GND | | |
| L3 | GND | Wiring | Wiring | GND |
| L4 | | Coverlay (removing GND fill) | | |

According to an embodiment, as indicated in Table 1, an FPCB 390 may include a plurality of layers L1, L2, L3, and L4, and at least some of the plurality of layers L1, L2, L3, and L4 may form a ground layer L2 electrically connected to a ground. According to an embodiment, the ground layer L2 of the FPCB 390 may include a metal pattern 1121 in which a metal material (e.g., copper) is regularly arranged to have a predetermined shape (e.g., a cross shape). According to an embodiment, the metal pattern 1121 provided on the ground layer L2 of the FPCB 390 may be provided to correspond to the entire region of the FPCB 390 except for a partial region adjacent to the folding support member 340. According to an embodiment, the FPCB 390 may include a flexible copper clad laminate (FCCL). For example, the FPCB 390 may have a form in which a polyester film, a polyimide film, or the like and a copper clad are bonded to each other using an adhesive (e.g., an acrylic adhesive). According to another embodiment, the FPCB 390 may be made of various material such as paper phenolic (FR-2, FR-3, or the like), epoxy (FR-4, FR-5, G-2, G-11, or the like), polyamide, B.T. metal, Teflon, ceramic, halogen free, or the like.

According to an embodiment, the ground layer L2 of the FPCB 390 may include at least one slit 1122 formed by removing at least a portion of the metal pattern 1121 (e.g., removal of copper foil) in a bending region 392 of the FPCB 390. According to an embodiment, the slit 1122 formed in the ground layer L2 may be formed parallel with the z-axis direction vertically penetrating the second portion 130*b* of the rollable display 130 in the second state.

According to an embodiment, the ground layer L2 of the FPCB 390 may be formed of a metal material (e.g., copper) in attachment regions 391 of the FPCB 390 to correspond to the entire area of the attachment regions 391 without a specific pattern. According to an embodiment, the metal material in the attachment region 391 may be grounded by being electrically connected to the metal pattern 1121 formed on the ground layer L2 of the FPCB 390.

According to various embodiments, the flexibility of the FPCB 390 may be strengthened by partially removing the copper clad from the ground layer L2 of the FPCB 390, as described above, and the rigidity of the FPCB 390 can be enhanced by completely filling the attachment region 391 with the copper clad.

Referring to FIG. 12, the FPCB 390 according to another embodiment may be implemented in a rigid form (e.g., a rigid PCB form) by arranging at least one electronic component 1211 in the attachment regions 391 of the FPCB 390. According to an embodiment, electronic components 1211 disposed in the attachment regions 391 of the FPCB 390 may include at least one of a switch, a resistor, a capacitor, an inductor, a diode, a transistor, an integrated circuit, an antenna, a speaker, a piezoelectric element, and/or a patch antenna. According to an embodiment, the patch antenna (not illustrated) may be an antenna for wireless communication in a predetermined band for wireless communication or a predetermined high-frequency band (e.g., the mmWave band).

Figure 13:
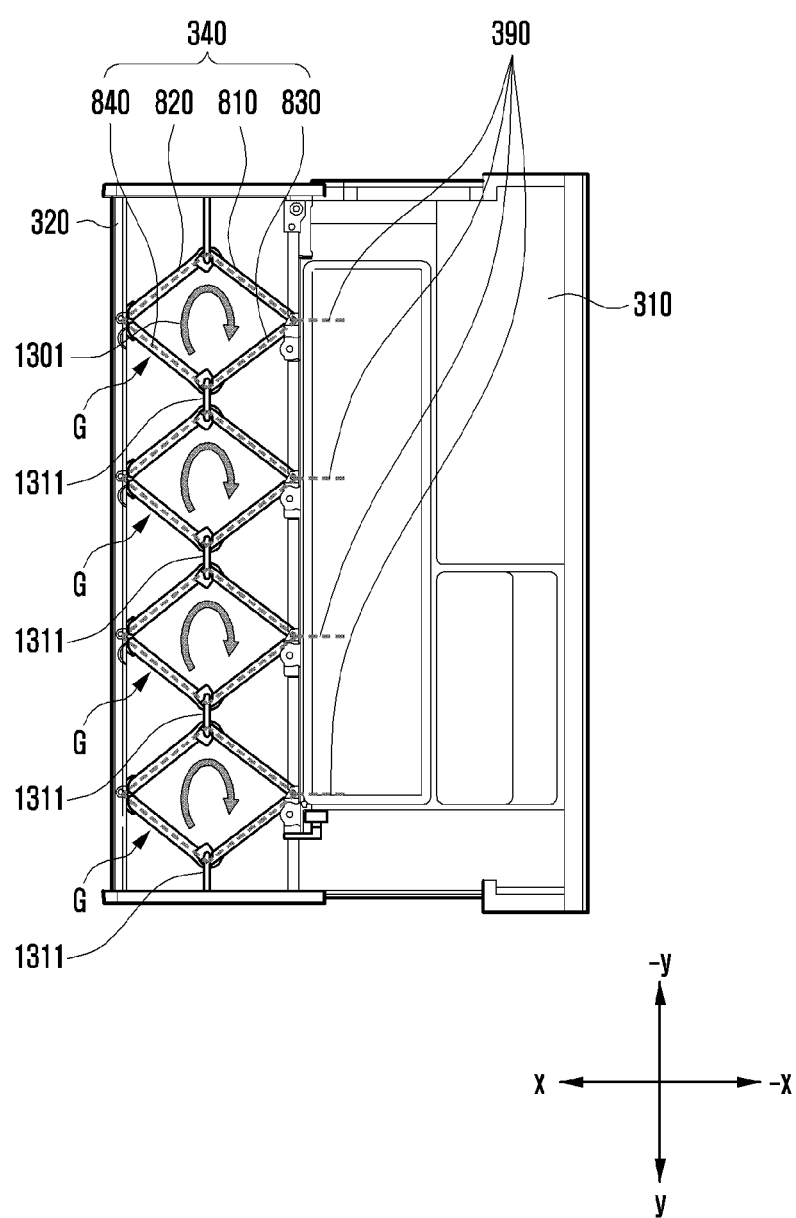
FIG. 13 is a view schematically illustrating an FPCB disposed to pass through a folding support member according to an embodiment of the disclosure.

FIG. 13 is a view schematically illustrating the FPCB 390 disposed to pass through the folding support member 340 according to an embodiment of the disclosure. For example, FIG. 13 may be a schematic view illustrating the arrangement of the folding support members 340 and the FPCB 390 according to the second state (e.g., the expanded state) of the electronic device 100.

The electronic device 100 illustrated in FIG. 13 may include an embodiment that is at least partially similar to or different from the electronic device 100 illustrated in FIGS. 1 to 8, 9A, 9B, 10A to 10G, 11, and 12. Hereinafter, only the features of the electronic device 100 that have not been described with reference to FIGS. 1 to 8, 9A, 9B, 10A to 10G, 11, and 12 or are changed from those of FIGS. 1 to 8, 9A, 9B, 10A to 10G, 11, and 12 will be described with reference to FIG. 13.

Referring to FIG. 13, unlike the folding support member 340 illustrated in FIGS. 1 to 8, the folding support member 340 according to another embodiment may further include at least one third support member 830 and at least one fourth support member 840.

According to an embodiment, the third support member 830 may be coupled to be rotatable from one side surface (e.g., the one side surface 312 in FIG. 8) of the main bracket 310 and may be disposed to be symmetrical with the first support member 810 in association with the movement of the first support member 810 when the electronic device 100 is in the second state. According to an embodiment, the third support member 830 may be disposed to face one side surface (e.g., the one side surface 312 in FIG. 8) of the main bracket 310 when the electronic device 100 is in the first state.

According to an embodiment, the fourth support member 840 may be coupled to be rotatable from one end of the third support member 830 and may be disposed to be symmetrical with the second support member 820 in association with the movement when the electronic device 100 is in the second state. According to an embodiment, the fourth support member 840 may be disposed parallel with the third support member 830 when the electronic device 100 is in the first state.

According to an embodiment, the first to fourth support members 810, 820, 830, and 840 may be arranged to have a quadrilateral or rhombus shape when viewed from the front direction of the electronic device 100 (in the z direction) when the electronic device 100 is in the second state.

According to an embodiment, the FPCB 390 may be disposed to pass through the first to fourth support members 810, 820, 830, and 840. For example, the FPCB 390 may be disposed to pass through at least one of the top surface (e.g., the surface oriented in the z direction), the bottom surface (e.g., the surface oriented in the −z direction), and or the side surface of each of the first to fourth support members 810, 820, 830, and 840. In some embodiments, the FPCB 390 may include a patch antenna disposed to pass through the support surfaces (e.g., the surfaces oriented in the z direction) (e.g., the first support surface 812 and the second support surface 822 in FIG. 9B) of each of the fourth support members 810, 820, 830, and 840, and to overlap the top surface. The FPCB 390 may operate as a patch antenna array when the electronic device 100 is in the second state.

According to an embodiment, since the FPCB 390 is disposed to pass through the first to fourth support members 810, 820, 830, and 840, when the electronic device 100 is in the second state, at least some lines (not illustrated) provided in the FPCB 390 may form a coil 1301 wound by a predetermined number of times when viewed in the z-axis direction that vertically penetrates the second portion 130*b* of the rollable display 130.

According to an embodiment, at least some lines (not illustrated) provided in the FPCB 390 may be used as an antenna for wireless communication in a predetermined frequency band by forming the coil 1301 when the electronic device 100 is in the second state. For example, according to an embodiment, at least some lines (not illustrated) provided in the FPCB 390 may be used as an antenna for short-range communication when the electronic device 100 is in the second state.

According to an embodiment, at least some lines provided in the FPCB 390 may be used as a wireless charging antenna.

According to an embodiment, at least some lines provided in the FPCB 390 may be used as a magnetic secure transmission (MST) antenna.

According to an embodiment, at least some lines provided in the FPCB 390 may be used as a near field communication (NFC) antenna.

According to an embodiment, the first to fourth support members 810, 820, 830, and 840 may perform a heat dissipation function of transferring heat generated from peripheral components. For example, the heat is transferred to a portion of the FPCB 390 disposed to pass through the first to fourth support members 810, 820, 830, and 840, and the heat transferred to the FPCB 390 may be diffused through the hinge rail (e.g., the hinge rail 350 in FIG. 3) and a heat dissipation member (not illustrated) (e.g., a metal plate) disposed toward the rear surface of the rollable display 130 (in the −z direction). According to an embodiment, the heat dissipation member disposed toward the rear surface of the rollable display 130 (in the −z direction) may be a conductive plate (not illustrated), and may include at least one of steel use stainless (SUS) (e.g., stainless steel (STS)), Cu, Al, or CLAD (e.g., a laminated member in which SUS and Al are alternately disposed).

According to an embodiment, the first to fourth support members 810, 820, 830, 840 may be defined as forming one supporting structure group G by being fastened to each other. According to various embodiments, the electronic device 100 may include support structure groups G as the folding support members 340, and the support structure groups G may be arranged at intervals. For example, the supporting structure groups G may be arranged at intervals in the third direction (the y direction) in which the roller members 320 are arranged. According to an embodiment, connecting bars 1311 are disposed between adjacent supporting structure groups G, respectively, and arranged in the third direction (the y direction) substantially parallel with the roller members 320.

Figure 14:
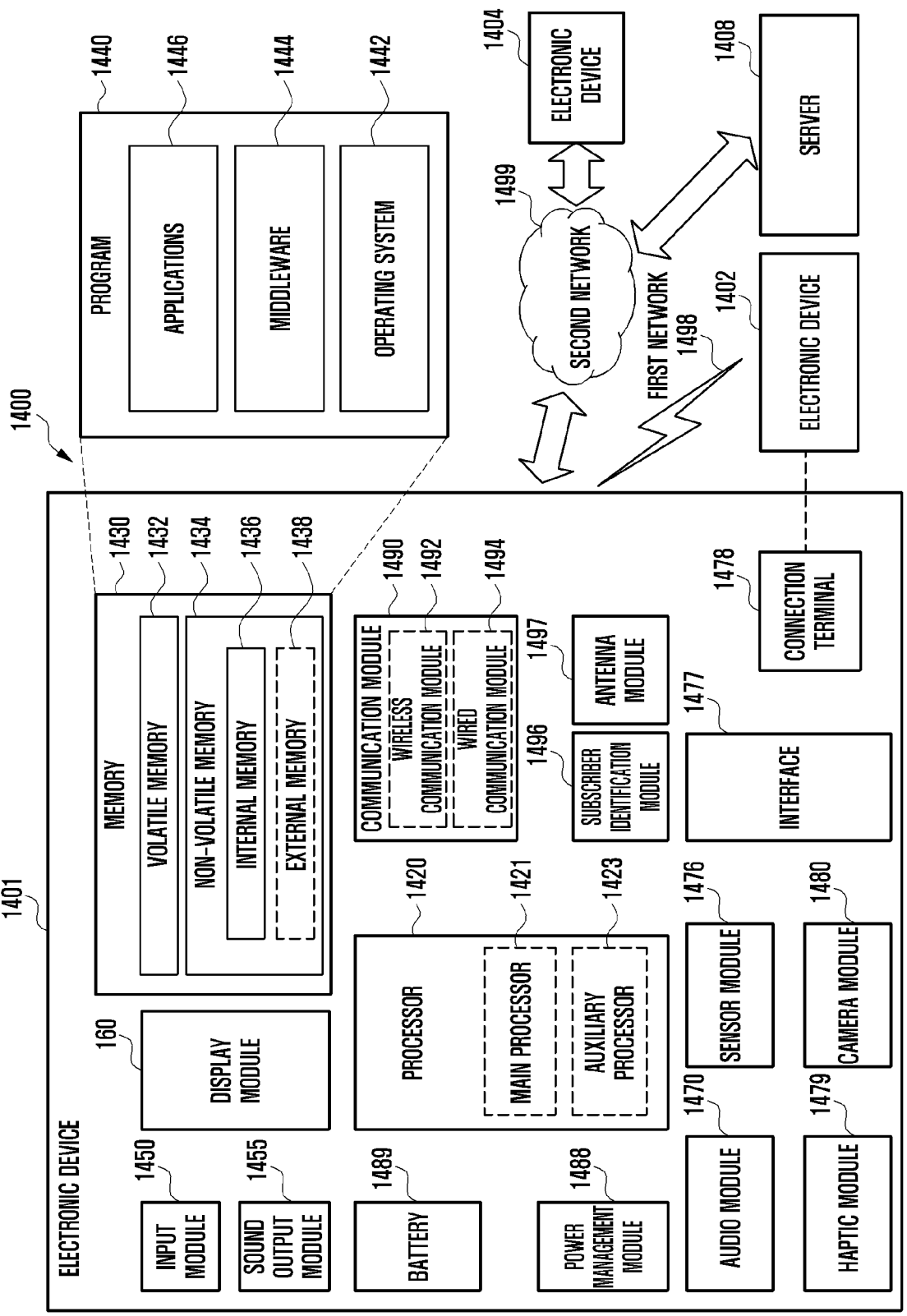
FIG. 14 is a block diagram of an electronic device in a network environment according to an embodiment of the disclosure.

FIG. 14 is a block diagram illustrating an electronic device in a network environment according to an embodiment of the disclosure.

Referring to FIG. 14, an electronic device 1401 in a network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 1464 dB or less) for implementing mMTC, or U-plane latency (e.g., 0.5 ms or less for each of downlink (DL) and uplink (UL), or a round trip of 14 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402 or 1404, or the server 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In another embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "14st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
    a housing;
    a rollable display supported by the housing and comprising a display region an area of which is adjusted in association with movement of at least a portion of the housing in a first direction,
    wherein the display region comprises:
        a first portion that is fixedly exposed an outside irrespective of the movement of the at least a portion of the housing in the first direction, and
        a second portion that extends from one end of the first portion and is exposed to the outside by being pulled out from an internal space of the housing in association with the movement of the at least a portion of the housing in the first direction;
    a main bracket disposed in the internal space of the housing and configured to support the first portion of the rollable display;
    a roller member disposed in the first direction from the main bracket and arranged in a third direction perpendicular to the first direction;
    at least one folding support member disposed between the main bracket and the roller member and configured to support the second portion of the rollable display,
    wherein the folding support member comprises:
        a first support member coupled to be rotatable from one side surface of the main bracket, disposed to form an angle in a predetermined first range with the one side surface of the main bracket when the electronic device is in a first state in which the second portion of the rollable display is visually exposed in the outside, and disposed to face the one side surface of the main bracket when the electronic device is in a second state in which the second portion of the rollable display is not visually exposed in the outside, and
        a second support member coupled to be rotatable from one end of the first support member, disposed to form an angle in a predetermined range with the first support member when the electronic device is in the first state, and disposed parallel with the first support member when the electronic device is in the second state;
    a circuit board disposed to overlap at least a portion of the main bracket;
    at least one electronic component disposed adjacent to the roller member; and
    a flexible printed circuit board (FPCB) configured to electrically connect the circuit board and the at least one electronic component,
    wherein the FPCB is disposed to pass through the first support member and the second support member of the folding support member and extends from a portion of the circuit board to a portion of the at least one electronic component.

2. The electronic device of claim 1,
    wherein the first support member comprises:
        a first support surface disposed to face the second portion of the rollable display,
        a first side surface extending from one end of the first support surface and disposed to face the one side surface of the main bracket when the electronic device is the second state, and
        a second side surface extending from another end of the first support surface and disposed to face the second support member when the electronic device is in the second state, and
    wherein the second support member comprises:
        a second support surface disposed to face the second portion of the rollable display,
        a third side surface extending from one end of the second supporting surface and disposed to face the second side surface of the first support member when the electronic device is in the second state, and
        a fourth side surface extending from the other end of the second support surface and disposed to face the roller member when the electronic device is in the second state.

3. The electronic device of claim 2, wherein at least a portion of the FPCB is disposed to pass through the first side surface of the first support member and the fourth side surface of the second support member.

4. The electronic device of claim 3, wherein at least a portion of the FPCB is attached to each of the first side surface of the first support member and the fourth side surface of the second support member by an adhesive member.

5. The electronic device of claim 2, wherein at least a portion of the FPCB is disposed to pass through the second side surface of the first support member and the third side surface of the second support member.

6. The electronic device of claim 5, wherein at least a portion of the FPCB is attached to each of the second side surface of the first support member and the third side surface of the second support member by an adhesive member.

7. The electronic device of claim 1,
wherein the folding support member comprises a hinge member configured to couple one end of the first support member and one end of the second support member to be rotatable relative to each other, and
wherein the FPCB comprises a bending region that is bent in association with the movement of the folding support member in a portion adjacent to the hinge member, wherein the bending region is disposed to have a wavy shape without being attached to the folding support member.

8. The electronic device of claim 7,
wherein a laminated structure of the FPCB comprises at least one ground layer on which a metal pattern electrically connected to a ground is provided, and
wherein the ground layer comprises at least one slit formed by removing at least a portion of the metal pattern from the bending region of the FPCB.

9. The electronic device of claim 8, wherein the slit is formed in a z-axis direction vertically penetrating the second portion of the rollable display in the first state.

10. The electronic device of claim 8,
wherein the FPCB comprises an attachment region attached to at least some side surfaces of the folding support member, and
wherein a metal material forming the metal pattern is formed in the attachment region of the FPCB to correspond to an entire area of the attachment region without a specific pattern.

11. The electronic device of claim 7,
wherein the FPCB comprises an attachment region attached to at least some side surfaces of the folding support member, and
wherein the at least one electronic component is disposed in the attachment region of the FPCB.

12. The electronic device of claim 1, wherein a cross-sectional structure obtained by cutting each of the first support member and the second support member has any one shape among a circular shape, an elliptical shape, a quadrilateral shape, a circular shape in which an opening is formed in one direction, an elliptical shape in which an opening is formed in one direction, a quadrilateral shape in which an opening is formed in one direction, and a shape in which a quadrilateral shape and a circular shape are combined.

13. The electronic device of claim 1, wherein the folding support member further comprises:
a third support member coupled to be rotatable from one side surface of the main bracket, disposed to be symmetrical with the first support member in association with the movement of the first support member when the electronic device is in the first state, and disposed to face the one side surface of the main bracket when the electronic device is in the second state, and
a fourth support member coupled to be rotatable from one end of the third support member, dispose to be symmetrical with the second support member when the electronic device is in the first state, and disposed parallel with the third support member when the electronic device is in the second state.

14. The electronic device of claim 13,
wherein the FPCB is disposed to pass through all of the first to fourth support members, so that at least some lines provided in the FPCB forms a coil wound a predetermined number of times when viewed in a z-axis direction vertically penetrating the second portion of the rollable display, and
wherein the at least some lines provided in the FPCB is used as antennas for wireless communication in a predetermined frequency band by forming the coil.

15. The electronic device of claim 14, wherein the at least some lines provided in the FPCB is used as a wireless charging antenna.

16. The electronic device of claim 14, wherein the at least some lines provided in the FPCB is used as a magnetic secure transmission (MST) antenna.

17. The electronic device of claim 14, wherein the at least some lines provided in the FPCB is used as a near field communication (NFC) antenna.

18. The electronic device of claim 14,
wherein the FPCB is disposed to pass through a support surface of each of the first to the fourth support members, and
wherein the support surface of each of the first to fourth support members is disposed to face the second portion of the rollable display.

19. The electronic device of claim 1, wherein at least one of a speaker module, a camera module, and an antenna module is disposed on the at least one electronic component.

20. The electronic device of claim 19, wherein the antenna module is an antenna module for cellular communication or short-range communication.

21. The electronic device of claim 1, further comprising:
a first connector region; and
a second connector region,
wherein the first connector region is connected to the circuit board is disposed at one end of the FPCB, and
wherein the second connector region is connected to the at least one electronic component is disposed at the other end of the FPCB.

22. The electronic device of claim 21, further comprising:
a battery,
wherein an extension region of the FPCB extends to pass through the battery.

23. The electronic device of claim 1, wherein the FPCB is disposed to extend from a portion of the circuit board to the at least one electronic component.

* * * * *